(12) United States Patent
Jiang et al.

(10) Patent No.: US 12,047,310 B2
(45) Date of Patent: *Jul. 23, 2024

(54) REFERENCE SIGNAL DESIGN BASED ON SEMI-UNIFORM PILOT SPACING

(71) Applicant: QUALCOMM Incorporated, San Diego, CA (US)

(72) Inventors: Jing Jiang, San Diego, CA (US); Joseph Binamira Soriaga, San Diego, CA (US); Krishna Kiran Mukkavilli, San Diego, CA (US); Tingfang Ji, San Diego, CA (US); Huilin Xu, San Diego, CA (US); Naga Bhushan, San Diego, CA (US); Raghuraman Krishnamoorthi, Cupertino, CA (US); Peter Pui Lok Ang, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 17/249,073

(22) Filed: Feb. 19, 2021

(65) Prior Publication Data
US 2021/0250148 A1    Aug. 12, 2021

Related U.S. Application Data

(63) Continuation of application No. 16/526,478, filed on Jul. 30, 2019, now Pat. No. 10,931,420, which is a
(Continued)

(51) Int. Cl.
*H04L 5/00* (2006.01)
*H04L 25/02* (2006.01)
(Continued)

(52) U.S. Cl.
CPC .......... *H04L 5/0026* (2013.01); *H04L 5/0048* (2013.01); *H04L 5/005* (2013.01);
(Continued)

(58) Field of Classification Search
CPC ..... H04L 5/0026; H04L 5/0048; H04L 5/005; H04L 25/0202; H04L 27/2613;
(Continued)

(56) References Cited

U.S. PATENT DOCUMENTS 8,437,332 B2    5/2013  Wang et al.
9,001,639 B2    4/2015  Wang et al.
(Continued)

FOREIGN PATENT DOCUMENTS

CN           1328389 A       12/2001
CN         101771443 A        7/2010
(Continued)

OTHER PUBLICATIONS

Qualcomm Incorporated: "CSI-RS for LTE-Advanced", 3GPP TSG-RAN WG1#61b, R1-103545, Jun. 22, 2010, Dresden, Germany, pp. 1-8.
(Continued)

*Primary Examiner* — Dady Chery
(74) *Attorney, Agent, or Firm* — Haynes and Boone, LLP

(57) ABSTRACT

Systems and techniques are disclosed to reduce pilot overhead by providing common reference signals coded with cover codes that are orthogonal in time and frequency domains. Common reference signals that are coded by cover codes orthogonal in both domains can be de-spread in both the time and frequency domains for improved resolution and larger pull-in windows for both. Also disclosed is semi-uniform pilot spacing in both the frequency and time domains. In a time domain, a first pilot symbol pair is spaced by a first time interval from each other and a second pilot
(Continued)

symbol pair is spaced by a second time interval from the first pair, the second interval being greater than the first. In a frequency domain, a first set of pilot symbols is densely placed in a selected frequency band and a second set of pilot symbols is sparsely placed surrounding and including the selected frequency band.

23 Claims, 11 Drawing Sheets

Related U.S. Application Data continuation of application No. 16/021,643, filed on Jun. 28, 2018, now Pat. No. 10,382,177, which is a continuation of application No. 14/866,748, filed on Sep. 25, 2015, now Pat. No. 10,038,528.

(60) Provisional application No. 62/094,721, filed on Dec. 19, 2014.

(51) Int. Cl.
*H04L 27/26* (2006.01)
*H04L 47/12* (2022.01)
*H04W 72/044* (2023.01)
*H04W 72/0446* (2023.01)
*H04W 72/0453* (2023.01)

(52) U.S. Cl.
CPC ...... *H04L 25/0202* (2013.01); *H04L 27/2613* (2013.01); *H04L 47/12* (2013.01); *H04W 72/0446* (2013.01); *H04W 72/0453* (2013.01); *H04W 72/0466* (2013.01)

(58) Field of Classification Search
CPC ................. H04L 47/12; H04L 25/0224; H04L 27/26025; H04L 27/26134; H04W 72/0446; H04W 72/0453; H04W 72/0466
See application file for complete search history.

(56) References Cited

U.S. PATENT DOCUMENTS

| | | |
|---|---|---|
| 10,038,528 B2 | 7/2018 | Jiang et al. |
| 10,382,177 B2 | 8/2019 | Jiang et al. |
| 2006/0165128 A1 | 7/2006 | Peake et al. |
| 2008/0198942 A1* | 8/2008 | Akella ............... H04L 27/2647 375/260 |
| 2009/0322613 A1 | 12/2009 | Bala et al. |
| 2012/0014477 A1 | 1/2012 | Ko et al. |
| 2012/0120905 A1 | 5/2012 | Ko et al. |
| 2012/0140716 A1 | 6/2012 | Baldemair et al. |
| 2012/0195285 A1 | 8/2012 | Ko et al. |
| 2013/0070580 A1 | 3/2013 | Wang et al. |
| 2013/0077658 A1 | 3/2013 | Hui et al. |
| 2013/0170569 A1* | 7/2013 | Karabinis ............ H04B 7/26 375/260 |
| 2013/0201840 A1 | 8/2013 | Sorrentino et al. |
| 2013/0343320 A1 | 12/2013 | Nakamura et al. |
| 2014/0098689 A1 | 4/2014 | Lee et al. |
| 2014/0112378 A1 | 4/2014 | Ji et al. |
| 2014/0146859 A1 | 5/2014 | Ram et al. |
| 2015/0249517 A1 | 9/2015 | Seo et al. |
| 2016/0095095 A1 | 3/2016 | Lorca |
| 2016/0105871 A1 | 4/2016 | Kwak et al. |
| 2016/0182201 A1 | 6/2016 | Jiang et al. |
| 2018/0309557 A1 | 10/2018 | Jiang et al. |
| 2019/0356441 A1 | 11/2019 | Jiang et al. |

FOREIGN PATENT DOCUMENTS

| | | |
|---|---|---|
| CN | 104038320 A | 9/2014 |
| EP | 2555452 A1 | 2/2013 |
| EP | 2978152 A1 | 1/2016 |
| JP | 2012521709 A | 9/2012 |
| JP | 2013502139 A | 1/2013 |
| JP | 2013524580 A | 6/2013 |
| JP | 2016512007 A | 4/2016 |
| WO | 2004042949 A1 | 5/2004 |
| WO | 2014025379 A2 | 2/2014 |
| WO | 2014200279 A1 | 12/2014 |

OTHER PUBLICATIONS

ZTE: "OCC Allocation and OCC Mapping", 3GPP TSG RAN WG1 meeting # 61, R1-102897, Montreal, Canada, May 10-14, 2010, pp. 1-5.
European Search Report—EP20212763—Search Authority—Munich—Mar. 15, 2021.
Huawei : "Email Discussion Summary of CSI-RS Design", 3GPP TSG RAN WG1 meeting #61, R1-103100, May 10-14, 2010, 15 Pages.
Nokia., et al., "Intra-cell CSI-RS Design", 3GPP TSG-RAN WG1 Meeting #61, R1-102956, May 10-14, 2010, 5 Pages.
Qualcomm Incorporated: "Further details on CSI-RS", 3GPP TSG-RAN WG1 Meeting #60b, R1-103288, May 10, 2010, pp. 1-11, XP050598363, [retrieved on May 6, 2010].
ETRI: "Common Reference Signal Structure for 8 Transmit Antennas" [online], 3GPP TSG-RAN WG1 Meeting #55, R1-084145, Nov. 2008, pp. 1-3, Retrieved from Internet URL:http://www.3gpp.org/ftp/tsg_ran/WG1_RL1/TSGR1_55/Docs/R1-084145.zip.
Huawei: "Common RS for DL high-order MIMO", 3GPP Draft, R1-090826 Common RS for DL High-Order MIMO, 3rd Generation Partnership Project (3GPP), Mobile Competence Centre, 650, Route Des Lucioles, F-06921 Sophia-Antipolis Cedex, France, No. Athens, Greece, Feb. 3, 2009, Feb. 3, 2009 (Feb. 3, 2009), 2 Pages, XP050318681, [retrieved on Feb. 3, 2009].
International Preliminary Report on Patentability—PCT/US2015/064261, The International Bureau of WIPO—Geneva, Switzerland, Jun. 20, 2017.
International Search Report and Written Opinion—PCT/US2015/064261—ISA/EPO—Oct. 6, 2016.
Partial International Search Report—PCT/US2015/064261—ISA/EPO—May 3, 2016.
Takeda K., et al., "Demodulation Reference Signal Using Two-Dimensional Orthogonal Cover Code Mapping for Multi-Antenna/Point Transmission in LTE-Advanced Downlink", IEICE Transactions on Communications, Communications Society, Tokyo, Japan, vol. E94-B, No. 12, Dec. 1, 2011 (Dec. 1, 2011), pp. 3354-3361, XP001571988, May 9, 2012, ISSN: 0916-8516, DOI: 10.1587/Transcom.E94.B.3354 abstract p. 3355, left-hand column paragraph [0004].
Kincheng Z., et al., "Reference Signal Design," In: LTE-Advanced Air Interface Technology, Sep. 5, 2012 (Sep. 5, 2012), CRC Press, XP055109683, ISBN: 978-1-46-650153-9, pp. 111-139, figure 3.36, p. 132-p. 133.
Mediatek Inc: "Views on L1 Procedure for Small Cell On/Off Transition Time Reduction", 3GPP TSG-RAN WG1 #78, R1-142914, Dresden, Germany, Aug. 18-Aug. 22, 2014, 4 Pages.

\* cited by examiner

REFERENCE SIGNAL DESIGN BASED ON SEMI-UNIFORM PILOT SPACING

CROSS-REFERENCE TO RELATED APPLICATIONS

The present application is a continuation of U.S. patent application Ser. No. 16/526,478, filed Jul. 30, 2019, which is a continuation of U.S. patent application Ser. No. 16/021,643, filed Jun. 28, 2018, which is a continuation of U.S. patent application Ser. No. 14/866,748, filed Sep. 25, 2015 which claims the benefit of U.S. Provisional Patent Application No. 62/094,721, filed Dec. 19, 2014, each of which being entitled "Common Reference Signal Design Based on Semi-Uniform Pilot Spacing and Orthogonal Cover Code," the disclosure of each of which is incorporated by reference herein in their entirety.

TECHNICAL FIELD

This application relates to wireless communication systems, and more particularly to semi-uniform pilot spacing and orthogonal spreading for reducing pilot signal overhead while still maintaining sufficient density for channel estimation and other purposes.

BACKGROUND

Reference signals, such as pilots, may be inserted in a transmitted data stream to assist a receiving entity with various functions, including not only channel estimation but also timing and frequency offset acquisition. A reference signal typically includes one or more modulation symbols known to both the transmitting entity and the receiving entity that are transmitted in a known manner. Since reference signals represent overhead in a system, it is desirable to minimize the amount of system resources used to transmit reference signals (e.g., pilots).

Conventional systems employ various types of reference signals, with varying fixed structures, to provide sufficient measurements and estimations for adaptive multi-antenna operation. For example, a common reference signal is a signal used by many if not all transmitters in a network to facilitate channel estimation. The common reference signal can employ a fixed pilot structure that provides an adequate number and distribution of pilot symbols for most receiving entities under most channel conditions. However, this approach results in a common overhead for all receiving entities. The common overhead becomes difficult to scale up to large numbers of transmit ports (e.g., in massive multiple-input, multiple-output (MIMO)) as well as results in a dense pilot structure that can cause pilot pollution in partially loaded or unloaded cells.

Another type of known reference signal is a channel state information reference signal (CSI-RS) that employs a fixed pilot structure that is significantly sparser than that used for the common reference signal. The CSI-RS is useful for estimating channel quality in frequencies other than those assigned to specific user equipment (UEs) in a given cell. Although CSI-RS results in a smaller overhead, the spacing can be too large in the time domain to train a frequency tracking loop. The CSI-RS may also result in an aliased channel energy response under a long delay spread channel. Thus, there is a need for techniques to provide reference signal spacing and structures that provide more information to estimate to channel conditions.

SUMMARY

In one aspect of the disclosure, a method for wireless communication includes applying, by a processor of a wireless communications device, a first cover code to a first pilot sequence to produce a first set of pilot symbols comprising a first common reference signal and a second cover code to a second pilot sequence to produce a second set of pilot symbols comprising a second common reference signal, wherein the first cover code and the second cover code are orthogonal to each other in time and frequency domains; delivering the first common reference signal using a first number of resource elements to a first transmit port; delivering the second common reference signal using a second number of resource elements to a second transmit port; transmitting, from the first transmit port, the first common reference signal; and transmitting, from the second transmit port, the second common reference signal.

In an additional aspect of the disclosure, a wireless communications device includes a processor configured to: apply a first cover code to a first pilot sequence to produce a first set of pilot symbols comprising a first common reference signal and a second cover code to a second pilot sequence to produce a second set of pilot symbols comprising a second common reference signal, wherein the first cover code and the second cover code are orthogonal to each other in time and frequency domains; deliver the first common reference signal using a first number of resource elements for transmission; deliver the second common reference signal using a second number of resource elements for transmission; and a transceiver comprising a first transmit port and a second transmit port, the first transmit port configured to transmit the first common reference signal and the second transmit port configured to transmit the second common reference signal.

In an additional aspect of the disclosure, a computer-readable medium having program code recorded thereon includes program code comprising code for causing a wireless communications device to apply a first cover code to a first pilot sequence to produce a first set of pilot symbols comprising a first common reference signal and a second cover code to a second pilot sequence to produce a second set of pilot symbols comprising a second common reference signal, wherein the first cover code and the second cover code are orthogonal to each other in time and frequency domains; code for causing the wireless communications device to deliver the first common reference signal using a first number of resource elements to a first transmit port; code for causing the wireless communications device to deliver the second common reference signal using a second number of resource elements to a second transmit port; code for causing the wireless communications device to transmit, from the first transmit port, the first common reference signal; and code for causing the wireless communications device to transmit, from the second transmit port, the second common reference signal.

In an additional aspect of the disclosure, a method for wireless communication includes receiving, at a wireless communications device, a first set of pilot symbols using a number of resource elements and spread with a first cover code; receiving, at the wireless communications device, a second set of pilot symbols using a second number of resource elements and spread with a second cover code, the first and second cover codes being orthogonal to each other in time and frequency domains, the first and second set of pilot symbols comprising a common reference signal; and de-spreading the first and second sets of pilot symbols in the frequency domain to recover at least two pilot observations in the time domain.

DETAILED DESCRIPTION

Figure 1:
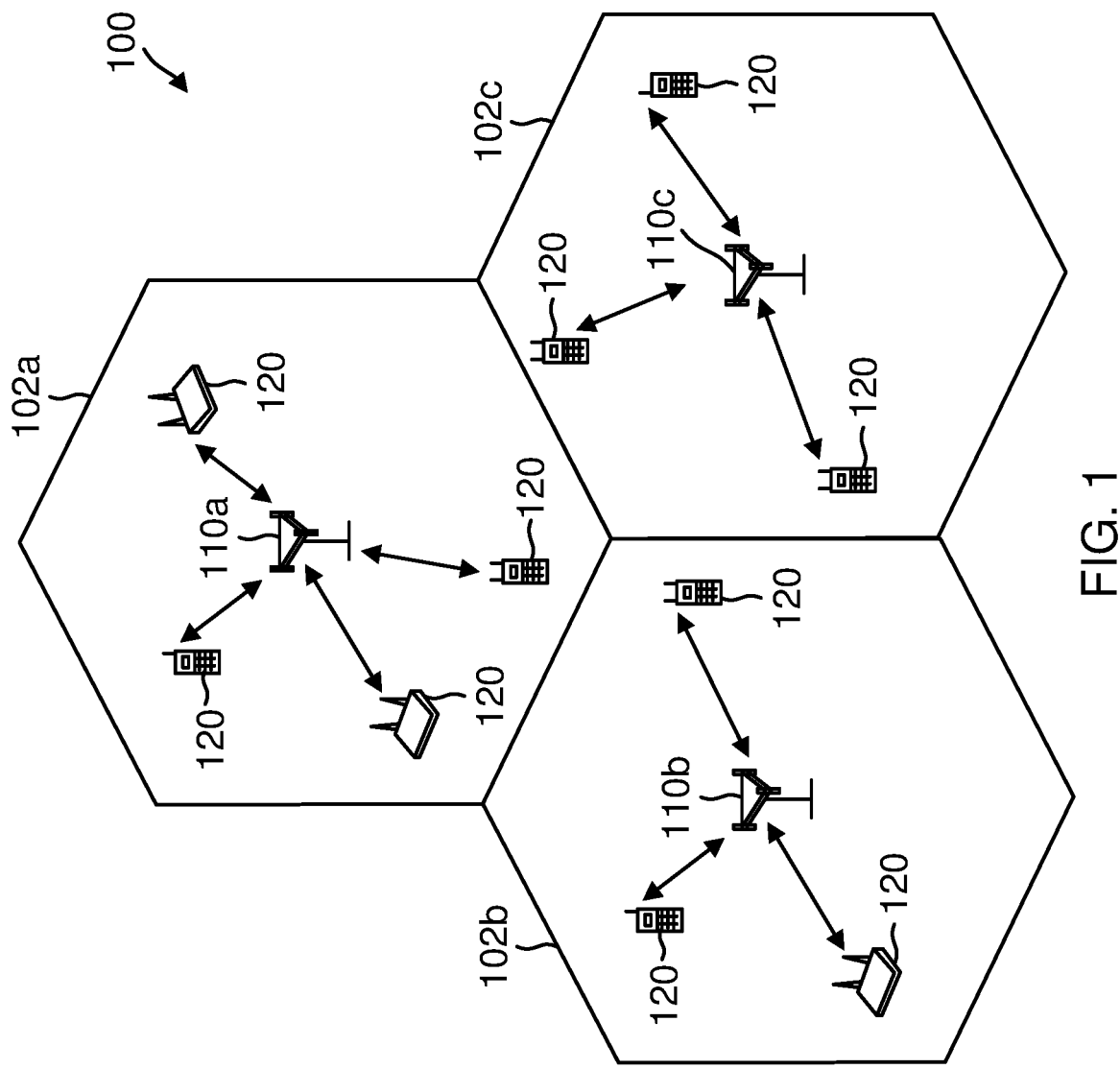
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to reduce pilot overhead by providing a common reference signal, such as a pilot symbol, that is orthogonal in time and frequency domains to replace the functionality of existing common reference signals and channel state information reference signals (CSI-RS) in wideband applications. Systems and techniques are also introduced for semi-uniform pilot spacing in both the frequency and time domains.

In an embodiment, pilot sequences are coded with cover codes that are orthogonal in time and frequency domains, resulting in a first set of pilot symbols that includes multiple pilot symbols in both the time and frequency domains for transmission at first/second transmit ports and a second set of pilot symbols that is similarly multi-dimensional in time and frequency domains for transmission. A receiving entity de-spreads the sets of pilot symbols in one or both of the time and frequency domains to obtain better frequency and time domain estimates with larger pull-in ranges than available with existing pilot structures that can only be de-spread in one domain or the other. With a common reference signal that is orthogonal in the time and frequency domains, receiving entities may de-spread the pilot symbols in both domains with increased resolution for better channel estimates, frequency tracking, time tracking, Doppler estimation, and other measurements useful in estimating channel conditions and making adjustments to improve communications.

In another embodiment, sets of pilot symbols are spaced in time for transmission so that a first pair of pilot symbols is separated by a first, relatively small time interval. A second pair of pilot symbols is spaced by a second, relatively large time interval from the first pair of pilot symbols. At the receiving end, the first pair of pilot symbols can be used to generate a coarse estimate of frequency error, and the relatively large time interval between the first and second pairs can be used to generate a fine resolution estimate of frequency error. The coarse estimate further refines the fine resolution estimate, e.g., by de-aliasing the fine resolution estimate. The sets of pilot symbols may also, or alternatively, be spaced in frequency so that there is a dense set of pilot symbols within a selected frequency band surrounded by, and overlapping with, a sparse set of pilot symbols throughout the frequency bandwidth, e.g. in the surrounding frequencies as well as the selected frequency band. The dense set provides a long time domain window for a channel estimate while the sparse set provides a wideband channel estimate to capture channel estimates across a wide bandwidth, which the dense set can de-alias for better resolution.

FIG. 1 illustrates a wireless communication network 100, in accordance with various aspects of the present disclosure. The wireless network 100 may include a number of base stations 110. A base station 110 may include an evolved Node B (eNodeB) in the LTE context, for example. A base station may also be referred to as a base transceiver station or an access point.

The base stations 110 communicate with user equipments (UEs) 120 as shown. A UE 120 may communicate with a base station 110 via an uplink and a downlink. The downlink (or forward link) refers to the communication link from a base station 110 to a UE 120. The uplink (or reverse link) refers to the communication link from a UE 120 to a base station 110.

The UEs 120 may be dispersed throughout the wireless network 100, and each UE 120 may be stationary or mobile. A UE may also be referred to as a terminal, a mobile station, a subscriber unit, etc. A UE 120 may be a cellular phone, a smartphone, a personal digital assistant, a wireless modem, a laptop computer, a tablet computer, etc. The wireless communication network 100 is one example of a network to which various aspects of the disclosure apply.

Embodiments of this disclosure are directed to any type of modulation scheme, but orthogonal frequency division multiplexing (OFDM) is used as a representative modulation. OFDM is a multi-carrier modulation technique that effectively partitions the overall system bandwidth into multiple (K) orthogonal frequency subbands. These subbands may also be referred to as tones, subcarriers, bins, and frequency channels. With OFDM, each subband is associated with a respective subcarrier that may be modulated with data. Up to K modulation symbols may be sent on the K subbands in each OFDM symbol period.

A pilot symbol may be a symbol known to both the transmitter and receiver and transmitted in a subband. For an OFDM symbol with K subbands, any number and configuration of subbands may be used for pilot symbols. For example, half of the subbands may be used for pilot symbols, and the remaining subbands may be used for other purposes, such as to transmit data symbols or control symbols or the remaining subbands may not be used at all. As used herein, a pilot symbol refers to a type of reference signal as will be recognized by those skilled in the relevant art(s). For simplicity of discussion, reference will be made herein to "pilot" and "pilot symbol" interchangeably as exemplary reference signals. An example pilot structure includes a combination of pilot density and placement (e.g., number of pilot symbols per unit time or per unit frequency).

The pilot transmission and signaling techniques described herein may be used for a single-input single-output (SISO) system, a single-input multiple-output (SIMO) system, a multiple-input single-output (MISO) system, and a multiple-input multiple-output (MIMO) system. These techniques may be used for an OFDM-based system and for other multi-carrier communication systems. These techniques may also be used with various OFDM subband structures.

Figure 2:
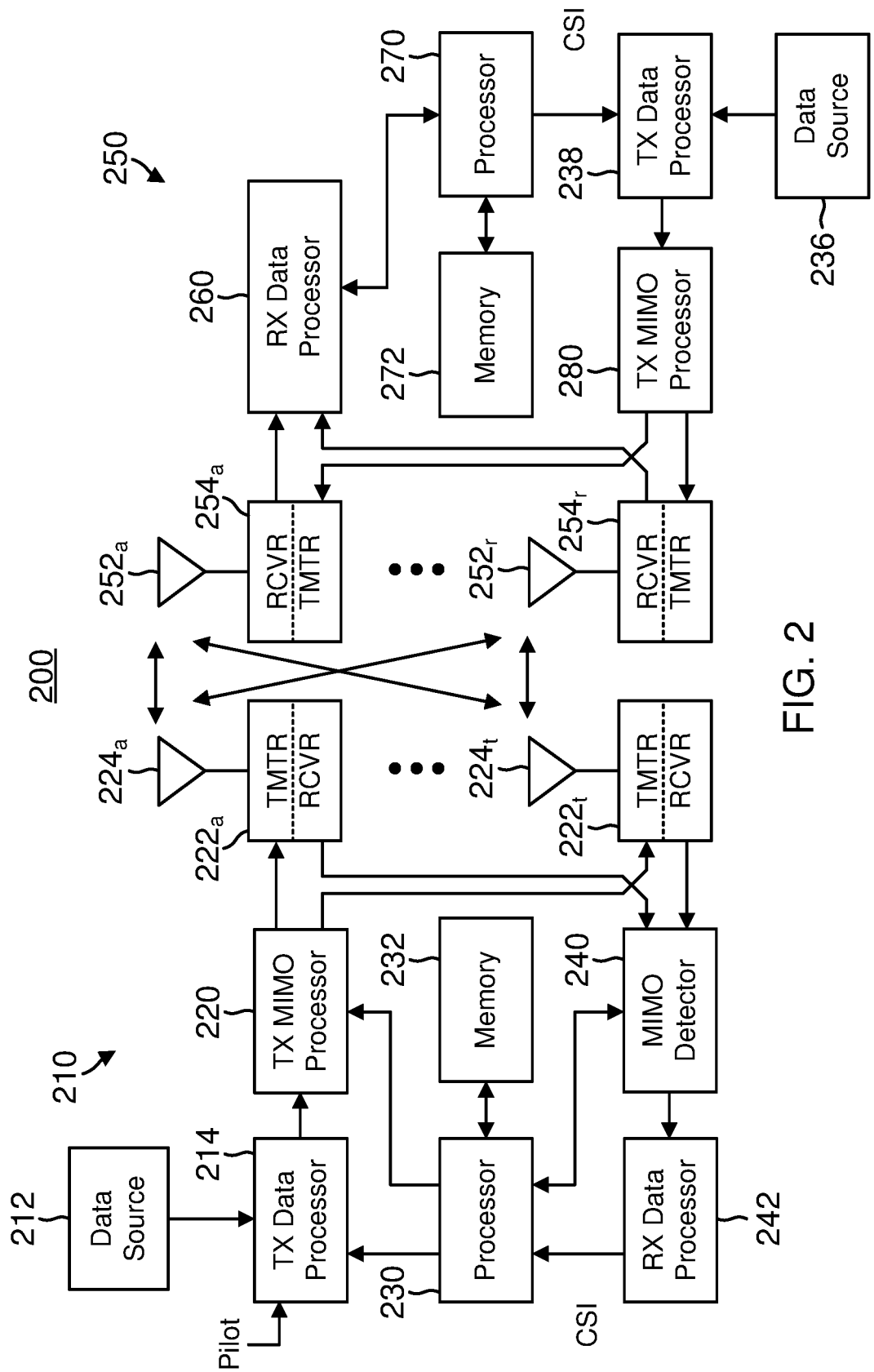
FIG. 2 is a block diagram illustrating an exemplary transmitter system in accordance with various aspects of the present disclosure.

FIG. 2 is a block diagram illustrating an exemplary transmitter system 210 (e.g., a base station 110) and a receiver system 250 (e.g., a UE 120) in a MIMO system 200, according to certain aspects of the present disclosure. At the transmitter system 210, traffic data for a number of data streams is provided from a data source 212 to a transmit (TX) data processor 214.

In a downlink transmission, for example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data, e.g., a pilot sequence, is typically a known data pattern that is processed in a known manner and may be used at the receiver system to estimate the channel response or other channel parameters. Pilot data may be formatted into pilot symbols. The number of pilot symbols and placement of pilot symbols within an OFDM symbol may be determined by instructions performed by processor 230.

The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. The number of pilot symbols and placement of the pilot symbols in each frame may also be determined by instructions performed by processor 230.

The processor 230 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 230 may also be implemented as a combination of computing devices, e.g., a combination of a DSP and a microprocessor, a plurality of microprocessors, one or more microprocessors in conjunction with a DSP core, or any other such configuration.

The transmitter system 210 further includes a memory 232. The memory 232 may be any electronic component capable of storing information and/or instructions. For example, the memory 250 may include random access memory (RAM), read-only memory (ROM), flash memory devices in RAM, optical storage media, erasable programmable read-only memory (EPROM), registers, or combinations thereof. In an embodiment, the memory 232 includes a non-transitory computer-readable medium.

Instructions or code may be stored in the memory 232 that are executable by the processor 230. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The modulation symbols for all data streams are then provided to a TX MIMO processor 220, that may further process the modulation symbols (e.g., for OFDM). TX MIMO processor 220 then provides $N_T$ modulation symbol streams to $N_T$ transmitters (TMTR) $222_a$ through $222_t$. In some embodiments, TX MIMO processor 220 applies beamforming weights to the symbols of the data streams and to the antenna from which the symbol is being transmitted. The transmitter system 210 includes embodiments having only one antenna or having multiple antennas.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas $224_a$ through $224_t$, respectively. The techniques described herein apply also to systems with only one transmit antenna. Transmission using one antenna is simpler than the multi-antenna scenario. For example, there may be no need for TX MIMO processor 220 in a single antenna scenario.

At receiver system 250, the transmitted modulated signals are received by $N_R$ antennas $252_a$ through $252_r$ and the received signal from each antenna 252 is provided to a respective receiver (RCVR) $254_a$ through $254_r$. Each receiver 254 conditions (e.g., filters, amplifies, and downconverts) a respective received signal, digitizes the conditioned signal to provide samples, and further processes the samples to provide a corresponding "received" symbol stream. The techniques described herein also apply to embodiments of receiver system 250 having only one antenna 252.

An RX data processor 260 then receives and processes the $N_R$ received symbol streams from receivers $254_a$ through $254_r$ based on a particular receiver processing technique to provide $N_T$ detected symbol streams. The RX data processor 260 then demodulates, deinterleaves, and decodes as necessary each detected symbol stream to recover the traffic data for the data stream. The processing by RX data processor 260 can be complementary to that performed by TX MIMO processor 220 and TX data processor 214 at transmitter system 210.

Information provided by the RX data processor 260 allows the processor 270 to generate reports such as channel state information (CSI) and other information to provide to the TX Data Processor 238. Processor 270 formulates a reverse link message comprising the CSI and/or pilot request to transmit to the transmitter system.

The processor 270 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 270 may also be implemented as a combination of computing devices, e.g., a combination of a DSP and a microprocessor, a plurality of microprocessors, one or more microprocessors in conjunction with a DSP core, or any other such configuration.

The reverse link message may comprise various types of information regarding the communication link and/or the received data stream. The reverse link message can be processed by a TX data processor 238, modulated by a TX MIMO processor 280, conditioned by transmitters $254_a$ through $254_r$, and transmitted back to transmitter system 210. As shown, the TX data processor 238 may also receive traffic data for a number of data streams from a data source 236.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250.

Figure 3A:
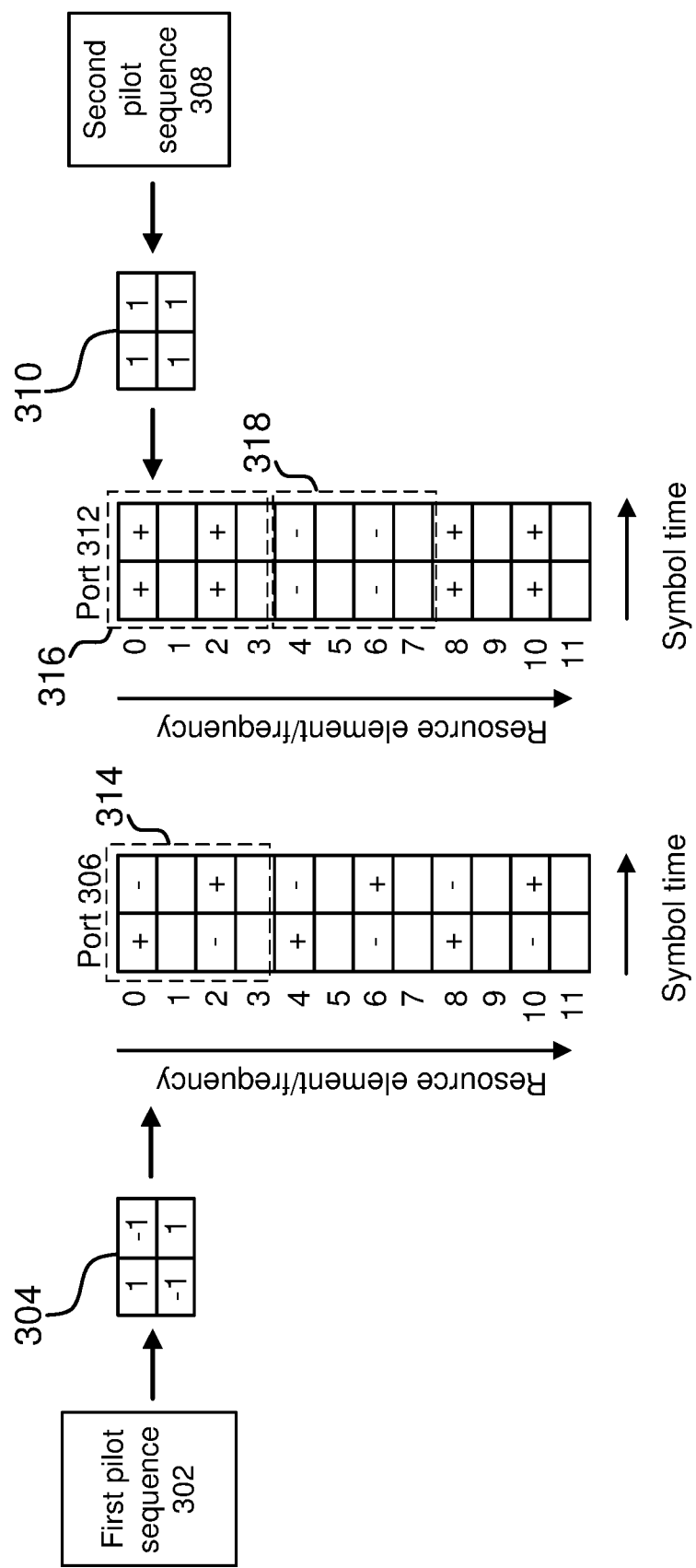
FIG. 3A illustrates a downlink frame structure for a common reference signal multiplexing design using multiple transmit ports in a wireless communication network in accordance with various aspects of the present disclosure.
Figure 3B:
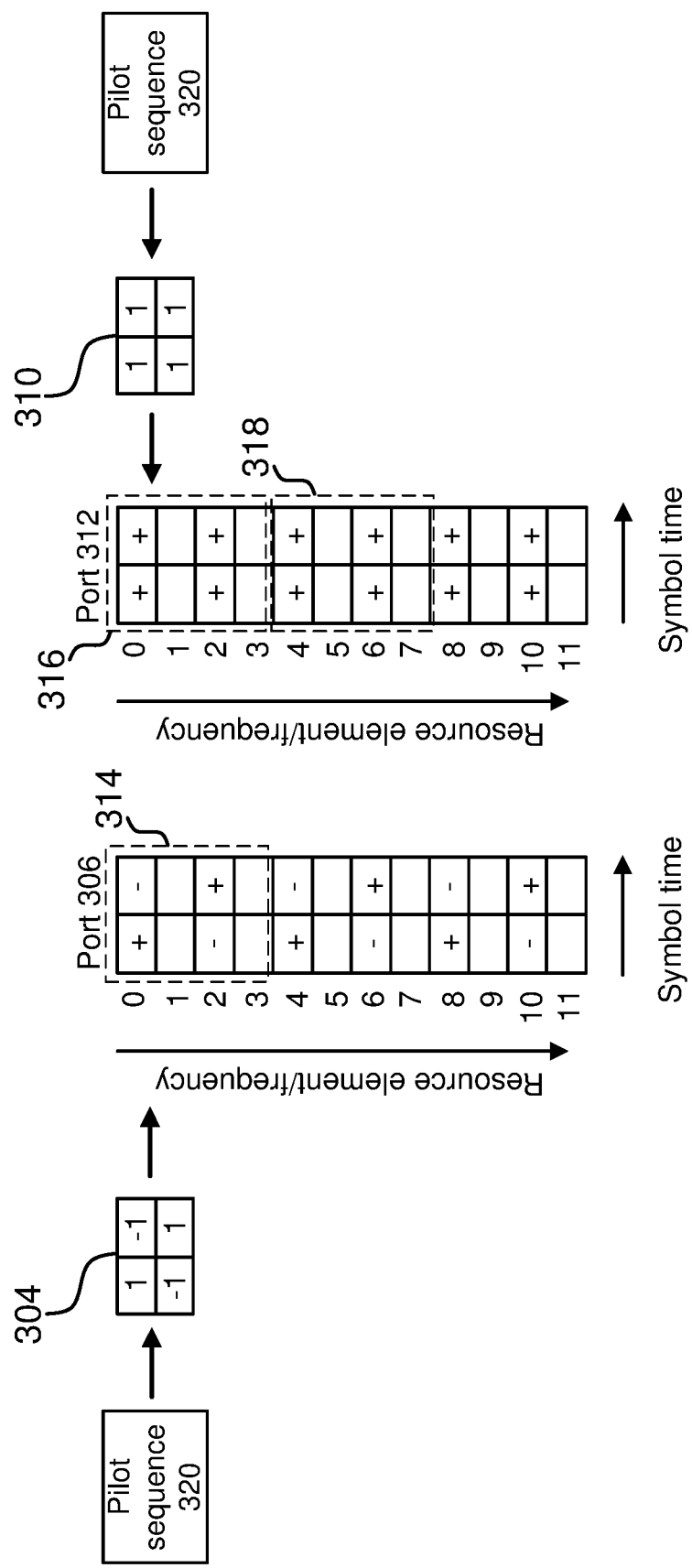
FIG. 3B illustrates a downlink frame structure for a common reference signal multiplexing design using multiple transmit ports in a wireless communication network in accordance with various aspects of the present disclosure.

FIGS. 3A-3B illustrate downlink frame structures for a pilot signal multiplexing design using multiple transmit ports in a wireless communication network (e.g., the wireless communication network shown in FIG. 1), in accordance with various aspects of the present disclosure. The transmission timeline for the downlink may be partitioned into units of transmission time intervals (TTIs) (not shown in FIG. 3A or 3B). A TTI may be related to the size of the data blocks passed from the higher network layers to the radio link layer. In some embodiments, the duration of symbols, such as OFDM symbols, is fixed, and there are a predetermined number of symbol periods during each TTI. For example, each TTI may be any number of symbol periods, such as 8, 10, or 12 symbol periods, as examples. In an example, each TTI may include eight OFDM symbol periods, and the symbol periods assigned indices for tracking purposes. A transmission during a TTI may be referred to as a frame, a subframe, or a data block. An OFDM symbol period is an example time slot.

A number of resource elements may be available in each OFDM symbol period. Each resource element may cover one subcarrier in one symbol period and may be used to send one modulation symbol, which may be a real or complex value.

As shown in each of FIGS. 3A-3B, there are 11 resource elements per OFDM symbol as an illustrative example. The resource elements are assigned indices 0 through 11 as shown. Pilot symbols are transmitted in the designated resource elements and are denoted in FIGS. 3A and 3B as either "+" or "−" as discussed in more detail below. The remaining resource elements are available for other types of symbols, such as data symbols or control symbols, or are simply unused or muted. There are other symbol periods within the TTI, as will be recognized, which are not shown in FIGS. 3A-3B for ease of illustration.

The pilot structures in FIGS. 3A-3B represent a signal format transmitted from at least two antenna ports. For example, in a MIMO system, the illustrated frame structures are transmitted from two ports, the ports 306 and 312. Each antenna from among a plurality of antennas may transmit the same or a different pilot structure. In one embodiment, the illustrated pilot structures are received by receive antennas, and may be part of a composite signal that is a sum of signals from a plurality of antennas at the receiving entity (e.g., a common reference signal).

FIG. 3A illustrates a pilot structure for the two transmission ports 306 and 312 according to an exemplary embodiment. As will be recognized, more pilot structures may be transmitted from additional transmission ports according to embodiments of the present disclosure. For purposes of simplicity, the following discussion will focus on two transmission ports as exemplary. According to the embodiment in FIG. 3A, pilot symbols are transmitted in OFDM symbol periods 0 and 1 in a given TTI (shown as the two columns for each of ports 306 and 312, respectively). Within periods 0 and 1, pilot symbols are transmitted in resource elements 0, 2, 4, 6, 8, and 10. As will be recognized, more or fewer resource elements than those shown may alternatively be used or available. Further, the pilot symbols may be transmitted in different periods of each TTI, e.g. at the start or at the end of each TTI to name some examples. The pilot symbols may be used for channel estimation, frequency tracking, and time tracking to name a few examples, for coherent demodulation of the physical channel.

Focusing first on port 306 of FIG. 3A, a first pilot sequence 302 may be provided, for example to the TX data processor 214 discussed above with respect to FIG. 2. The first pilot sequence 302 is multiplexed by multiplying with orthogonal cover code 304. The orthogonal cover code 304 may be, for example, a Walsh-Hadamard cover code. In the example given, the orthogonal cover code 304 is a codeword of length 4 (e.g., a code taken from a row of a 4×4 Walsh matrix), illustrated in FIG. 3A as [1 −1 −1 1] in a 2×2 matrix. Other lengths would be possible as well, as will be recognized by those skilled in the relevant art(s). In the example of FIG. 3A, the orthogonal cover code 304 is applied so as to provide multi-dimensionality in the time and frequency domains. For example, the first two values, here 1 and −1 shown in the top row of the 2×2 matrix, are applied over two symbol periods for a first subcarrier 0. The last two values, here −1 and 1 shown in the bottom row of the 2×2 matrix, are applied over a second subcarrier 2 in the same two symbol periods.

As shown in FIG. 3A, use of the orthogonal cover code 304 with the first pilot sequence 302 results in the pilot symbol structure shown in the columns for port 306. Looking at group 314 as an example, the pilot symbol in period 0 of resource element 0 has a positive value (e.g., +1), while the pilot symbol in period 1 of resource element 0 has a negative value (e.g., −1). As a further example, the pilot symbol in period 0 of resource element 2 has a negative value (e.g., −1) while the pilot symbol in period 1 of resource element 2 has a positive value (e.g., +1). This is a result of the particular orthogonal cover code 304 as discussed above. This pattern is then repeated in the other groups for the first port 306 across additional subcarriers, as can be seen in FIG. 3A. After spreading, the spread sequence is supplied to the first port 306 for transmission.

A second pilot sequence 308 is also provided, for example to the TX data processor 214. In the embodiment of FIG. 3A, the pilot sequences 302 and 308 are not the same, e.g. the pilot sequences 302 and 308 are different from each other. The second pilot sequence 308 is multiplexed by multiplying with orthogonal cover code 310. The orthogonal cover code 310 may also be a Walsh-Hadamard cover code. As shown, the orthogonal cover code 310 has a sequence [1 1 1 1] illustrated in a 2×2 matrix. As will be recognized, orthogonal cover code 310 is orthogonal to orthogonal cover code 304. The codes may be, for example, taken from different rows of a Walsh matrix where the rows are mutually orthogonal. In the example of FIG. 3A, the orthogonal cover code 310 is applied so as to provide multi-dimensionality in the time and frequency domains as well. For example, the first two values, here 1 and 1 shown in the top row of the 2×2 matrix, are applied over two symbol periods for a first subcarrier 0. The last two values, here 1 and 1 shown in the bottom row of the 2×2 matrix, are applied over a second subcarrier 2 in the same two symbol periods. In some embodiments, the symbol periods at the first and second ports 306, 312 are the same.

As shown in FIG. 3A, use of the orthogonal cover code 310 with the second pilot sequence 308 results in the pilot symbol structure shown in the columns for the second port 312. Looking at group 316 as an example, the pilot symbols in periods 0 and 1 of resource elements 0 and 2 each have positive values (e.g., +1). Turning to group 318, the pilot symbols in periods 0 and 1 of resource elements 4 and 6 each have negative values (e.g., −1). Since the same orthogonal cover code 310 is applied to each of groups 316 and 318, the values for the pilot symbols in the group 318 illustrate that the second pilot sequence 308 varies between the two groups 316 and 318. For example, in FIG. 3A it can be seen that the first pilot sequence 302 can include a series of 1 values (e.g., [1 1 1 1 . . . n]). In contrast, the second pilot sequence 308 can include both 1 and −1 values (e.g., [1 1 1 1 −1 −1 −1 −1 . . . n]). This pattern of the second pilot sequence 308 can be repeated in the other groups for the second port 312 across additional subcarriers, as can be seen in FIG. 3A. After spreading by the orthogonal cover code 310, the spread sequence can be supplied to the second port 312 for transmission.

The spread sequences are then transmitted by multiple antennas from the first and second ports 306 and 312. In an embodiment, the spread sequences are additionally scrambled in the frequency domain before transmission, using either the same or different scrambling codes at each port. As can be seen, each of ports 306 and 312 transmit their respective pilot symbols in the same periods (e.g., 0 and 1) of the same resource elements (e.g., 0 and 2, etc.), and thus may result in a multiplexed, composite pilot symbol pair consisting of a combination of the pilot symbols generated at port 306 and the pilot symbols generated at port 312. The above patterns multiplexed at the first and second ports 306 and 312 are used for a common reference signal. Because it utilizes two resource elements in both the time and frequency domains, embodiments of the present disclosure provide a substitute reference signal for both the common reference signal and the CSI-RS. In this regard, the conventional common RS is frequency division multiplexed (FDM) so that the symbols at two transmit ports are not overlapping with each other, while the CSI-RS is spread over the time domain but not the frequency domain.

In contrast, the signals transmitted from ports 306 and 312 are orthogonal to each other in both the time and frequency domains, so that data may be recovered in both the frequency and time domains. In embodiments of the present disclosure, pilot overhead may therefore be reduced. The signals transmitted from ports 306 and 312 may be used for purposes other than data demodulation. This is in contrast to reference signals used for data demodulation, such as the demodulation reference signal (DMRS). DMRS is a reference signal that must be sent along with actual data and is specific to individual users. In other words, the DMRS is only present when a UE has data to send; otherwise, the DMRS is not sent (in the uplink or downlink) and therefore cannot be used for time or frequency correction (because it is absent), or during connection setup, etc. In contrast, the modified common reference signal according to embodiments of the present disclosure may be used for both frequency and time tracking correction for all UEs (regardless of connection status), since it is transmitted whether there is data present as well or not (e.g., whether UEs are idle or connected). The common reference signals transmitted from ports 306 and 312 may be used, instead, for channel state feedback, tracking loops, and control channel demodulation, to name a few examples, These purposes do not have to support a very high data throughput at high signal-to-noise ratio. For example, the SNR ceiling in embodiments of the present disclosure may be set to be greater than 10 dB.

On the receiving end, a receiving entity such as a UE 250 receives the two spread sequences of the composite signal at corresponding receivers, such as RCVR 254a and 254b. The RCVRs 254 condition their respective received signals, digitize the conditioned signals, and produce received symbol streams. A processor, such as the RX data processor 260 of FIG. 2, receives the symbol streams from the receivers and de-spreads the detected symbol streams and/or performs one or more channel estimation schemes to the received symbol streams. In embodiments of the present disclosure, by providing multiple symbols in both frequency and time domains (and that are orthogonal in each), the received symbol streams may be de-spread in one or both of the time and frequency domains or perform channel estimation jointly over both time and frequency.

De-spreading in the time domain doubles the channel estimation window over what would be conventionally possible from reference signals spread in just one domain, as well as increases a pull-in range for a time tracking loop. Thus, if the processor de-spreads the received symbol streams in the time domain, one pilot observation (e.g., one pilot symbol) will be recovered in the time domain but a denser pilot will be recovered in the frequency domain than would conventionally occur. With this denser pilot and increased window, better estimates may be made of the channel in the frequency domain, for example used in estimating long channel delay spread.

De-spreading in the frequency domain supports a wide pull-in range for a frequency tracking loop, for example over 18 kHz. If the processor de-spreads the received symbol streams in the frequency domain, two pilot observations (e.g., two pilot symbols) in the time domain will be recovered while a sparser pilot (e.g., sparser than what is recovered by de-spreading in the time domain mentioned above) is recovered in the frequency domain. With two pilot observations, frequency tracking may be performed. In an embodiment, the processor may de-spread the received symbol streams in both the time and frequency domains. As will be recognized, the received symbol streams may be de-spread in just one of the two domains in the alternative, or a channel estimation may be derived jointly from the two-dimensional orthogonal cover coded pilots.

FIG. 3B illustrates a pilot structure for the two transmission ports 306 and 312 according to an alternative exemplary embodiment. For purposes of simplicity of discussion, focus will be on aspects that are different from what was discussed above with respect to FIG. 3A. In FIG. 3B, the same pilot sequence 320 is provided for eventual transmission at each of ports 306 and 312 (instead of different pilot sequences 302, 308 in FIG. 3A). The pilot sequence 320 is multiplexed by multiplying with orthogonal cover code 304 as discussed above with respect to FIG. 3A, resulting in the pilot symbol structure shown in the columns for port 306.

A copy of the pilot sequence 320 is also multiplexed by multiplying with orthogonal cover code 310 as discussed above with respect to FIG. 3A, resulting in the pilot symbol structure shown in the columns for port 312. As can be seen, since the orthogonal cover code 310 is [1 1 1 1], and the same pilot sequence 320 is provided to each port, the resulting pilot symbols have the same values as the initial pilot sequence 320. Looking at group 316 as an example, the pilot symbols in periods 0 and 1 of resource elements 0 and 2 each have positive values (e.g., +1). Turning to group 318, the pilot symbols in periods 0 and 1 of resource elements 4 and 6 also each have positive values. It can be seen that the pilot sequence 320 can include a series of 1 values (e.g., [1 1 1 1 . . . n]). This pattern can be repeated in the other groups for the second port 312 across additional subcarriers, as can be seen in FIG. 3B.

The spread sequences are then transmitted from the first and second ports 306 and 312. In an embodiment, the spread sequence at the first port 306 is additionally scrambled in the frequency domain before transmission while the spread sequence at the second port 312 is not. In this scenario, an inverse fast Fourier transform (IFFT) of the spread sequence at the first port 306 corresponds to a time domain shift of half of the channel impulse response length for the first port 306. In an alternative embodiment, if a random scrambling sequence is applied to the spread sequence at the second port 312, when estimating the channel impulse response for one port the channel from the other port may become the noise floor.

The embodiment in FIG. 3B may be suitable in situations where there is relatively low channel delay-spread. In such situations, the received symbol stream transmitted from the second port 312 may appear as an aliased signal to the received symbol stream from the first port 306, which may be processed and addressed during channel estimation.

The embodiment in FIG. 3A may be suitable when the channel delay-spread is not low. Either port's transmission may appear as interference to the signal transmitted from the other port, which may be suitably processed to remove the noise as will be recognized by those skilled in the relevant art(s). The decision to use either the embodiment of FIG. 3A or the embodiment of FIG. 3B may be predetermined, e.g. at the time of network deployment, or dynamically determined for example based on receiving entity preferences (e.g., a UE's preferences or request).

The above discussion has focused on two transmit ports for ease of illustration. As will be recognized, in a MIMO system there could be more than two transmit ports/antennas. In an embodiment, the same pattern may be reproduced at other port/antenna pairs. Alternatively, different patterns may be produced at the other port/antenna pairs using different cover codes that maintain orthogonality in the pair, as well as to the first two ports.

Figure 4:
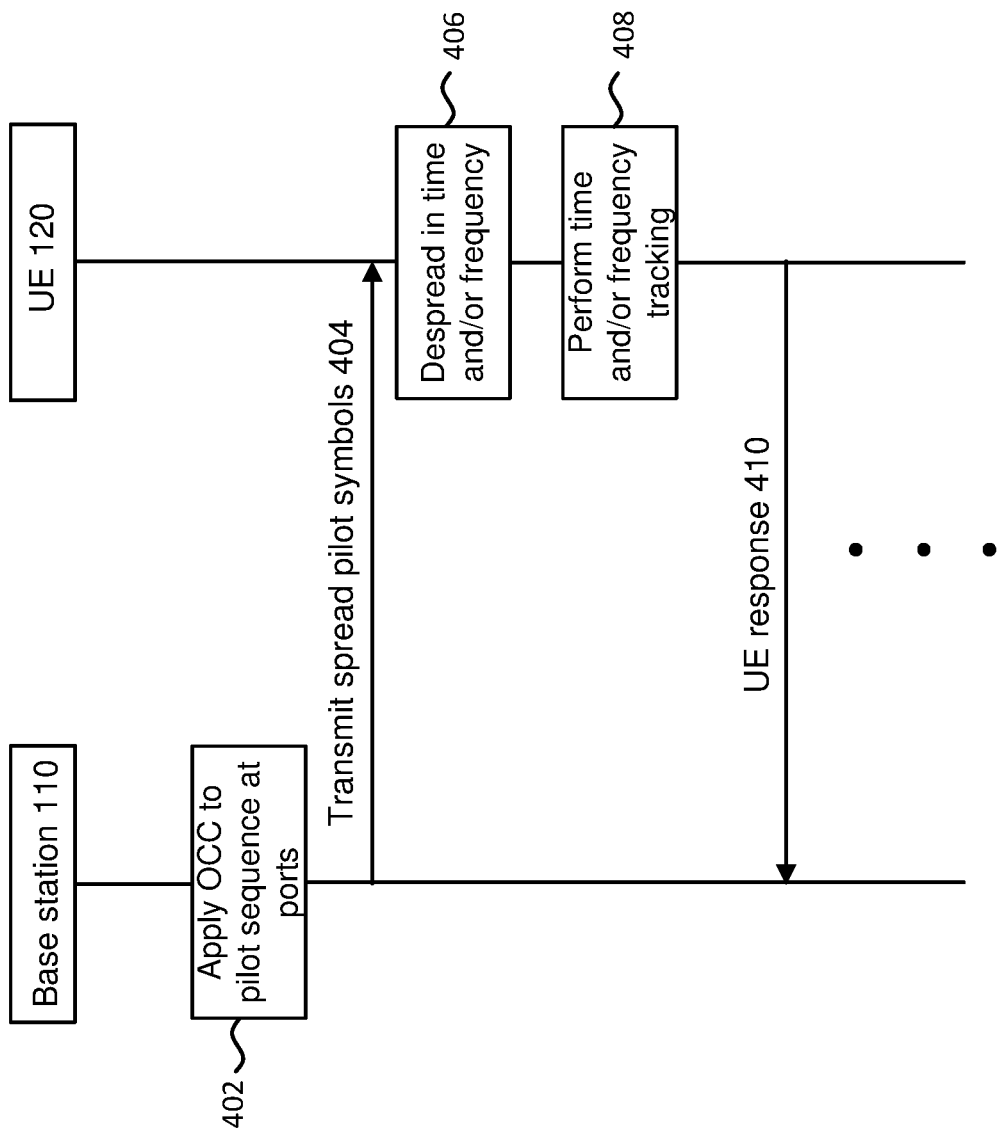
FIG. 4 is a protocol diagram illustrating some signaling aspects between a base station and a UE for supporting common reference signals multiplexed using multiple transmit ports in accordance with various aspects of the present disclosure.

FIG. 4 is a protocol diagram illustrating some signaling aspects between a transmitting entity, such as a base station 110, and a receiving entity, such as a UE 120, for supporting common reference signals multiplexed using orthogonal cover codes and multiple transmit ports in accordance with various aspects of the present disclosure.

In action 402, separate cover codes are applied to pilot sequences for each of two transmit ports at the base station 110. These cover codes, with additional processing, result in pilot symbols for each port that are orthogonal to each other in both the time and frequency domains. For example, separate Walsh codes (e.g., from different rows of a Walsh matrix) may be applied to each pilot sequence to result in two symbols in the time domain per subband, and two subbands per group. The pilot sequences may be different for each port or the same, as discussed above for FIGS. 3A and 3B, respectively.

In action 404, the pilot symbols are transmitted from both transmit ports of the base station 110, such as ports 306 and 312 of FIGS. 3A and 3B above, e.g. using the same resource elements resulting in a composite pilot symbol pair.

In action 406, the UE 120 receives the pilot symbols of the composite pilot symbol pair with corresponding receivers and de-spreads the received pilot symbols in the time and/or frequency domains. This is possible because the base station transmitted multiple pilot symbols in both time and frequency domains from each transmit port. De-spreading in the time domain results in a denser spread of pilot symbols in the frequency domain than would otherwise be available (for example, to estimate long channel delay spread), and de-spreading in the frequency domain results in multiple pilot symbols recovered in the time domain.

In action 408, the UE 120 performs channel estimation, frequency tracking, and/or time tracking as a result of the de-spreading. For example, the UE 120 performs channel estimation and/or a time tracking loop when the received pilot symbols are de-spread over time. The UE 120 updates a frequency tracking loop with a wide pull-in range when the received pilot symbols are de-spread over frequency. In an embodiment, the UE 120 de-spreads over both time and frequency to take advantage of the larger time and frequency pull-in ranges and denser pilot structure in the time or frequency domains (de-spread over frequency and time, respectively).

In action 410, the UE 120 responds to the base station 110. For example, the UE 120 may modify one or more parameters in response to information derived from channel estimation, time tracking, and/or frequency tracking to name a few examples and use the modified parameters in responding to the base station 110. Further, the UE 120 may include information about the quality of the channels used as part of the response back to the base station 110.

The base station 110 may also measure characteristics of the channels used, such as Doppler spread, channel delay spread, interference measurements, and/or signal-to-noise-plus-interference ratios. For example, the base station 110 may use uplink measurements to change downlink data structures, including the pilot sequences used for pilot symbol formation.

Figure 5B:
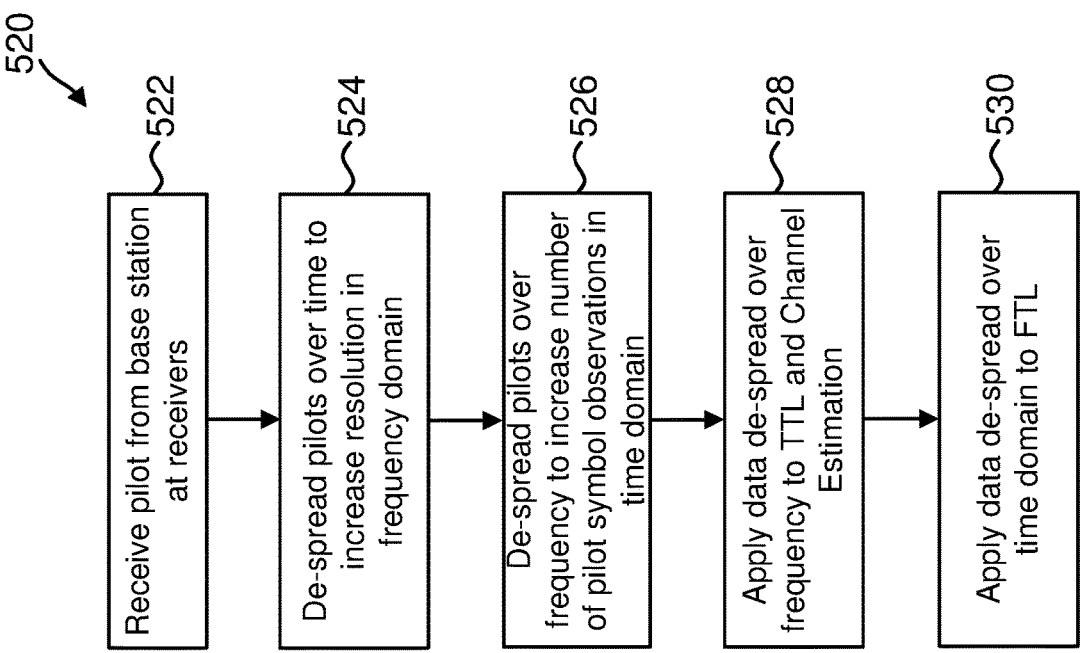
FIG. 5B is a flowchart illustrating an exemplary method for utilizing a common reference signal received at multiple receiver ports in accordance with various aspects of the present disclosure.
Figure 5A:
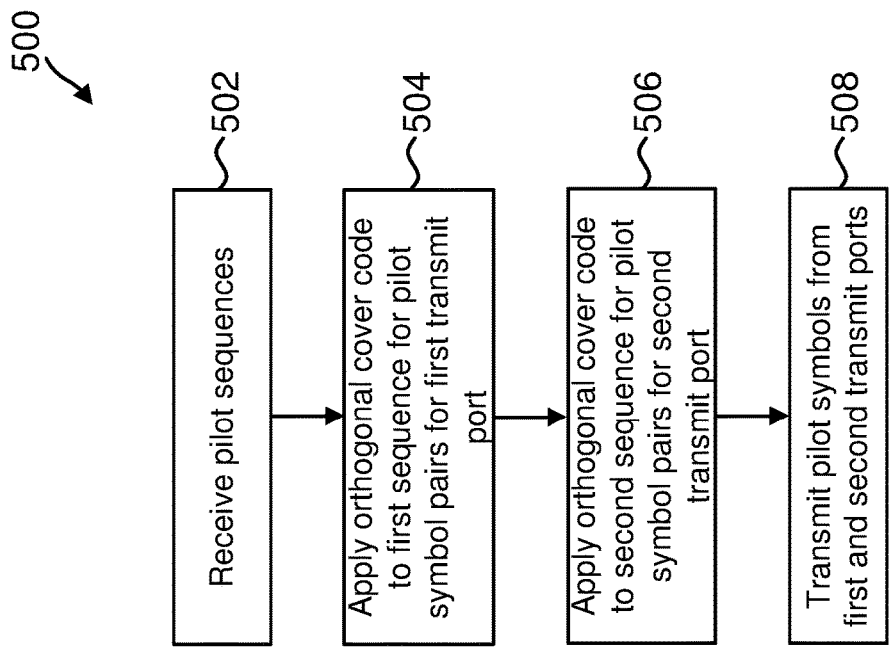
FIG. 5A is a flowchart illustrating an exemplary method for generating and multiplexing a common reference signal using multiple transmit ports in accordance with various aspects of the present disclosure.

FIG. 5A is a flowchart illustrating an exemplary method 500 for generating and multiplexing a common reference signal using multiple transmit ports in accordance with various aspects of the present disclosure. The method 500 may be implemented in a base station 110 that is in communication with one or more UEs 120. The method 500 may be implemented in the transmitter system 210 of FIG. 2 above. Instructions or code may be stored in the memory 232 that are executable by the processor 230 and/or the TX data processor 214 in the transmitter system 210 to implement the method 500.

At step 502, the processor receives pilot sequences for two transmit ports. For example, the TX data processor 214 may receive the pilot sequences from the data source 212 or from some other source. In one embodiment, the processor receives two separate pilot sequences, one for each transmit port. In an alternative embodiment, the processor receives the same pilot sequence that will be multiplexed with different cover codes for the different transmit ports.

At step 504, the processor applies a first cover code to a first pilot sequence. As a result of applying the first cover code to the first pilot sequence, multiple pilot symbols are produced for the first transmit port, for example two pilot symbols in two different symbol periods in both of two different sub-bands in a TTI.

At step 506, the processor applies a second cover code to a second pilot sequence. The first and second cover codes are orthogonal to each other in both the time and frequency domains. As a result of applying the second cover code to the second pilot sequence, multiple pilot symbols are produced for the second transmit port, for example two pilot symbols in two different symbol periods in both of two different sub-bands in a TTI.

At step 508, the processor provides the pilot symbols to their respective transmit ports, for example to transmitters $222_a$ and $222_b$, and the pilot symbols are transmitted as data streams over their respective transmit antennas. As the pilot symbols at the respective transmit ports may be transmitted using the same resource elements in the same time slots, they may constitute a composite pilot symbol pair during transmission over the air.

FIG. 5B is a flowchart illustrating an exemplary method 520 for utilizing a common reference signal received at multiple receiver ports in accordance with various aspects of the present disclosure. The method 520 may be implemented in a UE 120 that is in communication with a base station 110. The method 520 may be implemented in the receiver system 250 of FIG. 2 above. Instructions or code may be stored in the memory 272 that are executable by the processor 270 and/or the RX data processor 260 in the receiver system 250 to implement the method 520.

At step 522, a receiver receives pilot signals transmitted from two transmit ports at the base station 110 at two receivers, such as receivers $254_a$ and $254_b$. The receivers $254_a$ and $254_b$ may condition their respective received signals, digitize the conditioned signals, and produce received symbol streams.

At step 524, a processor de-spreads the received symbol streams in the time domain. De-spreading in the time domain results in one observation in the time domain while increasing the resolution in the frequency domain, e.g. resulting in a denser collection of pilot symbols than would normally be recovered, and in a larger channel estimation window and pull-in range than conventionally possible.

At step 526, the processor de-spreads the received symbol streams in the frequency domain. De-spreading in the frequency domain results in at least two observations in the time domain with a wider frequency pull-in range than conventionally possible, while resulting in a sparser collection of pilot symbols in the frequency domain. Although described in two separate steps, it will be recognized that the acts of de-spreading in the time and frequency domains may be performed either sequentially (in either order) or at the same time if there is sufficient processing power/availability. Further, the processor may de-spread in only of the time and frequency domains. That is, only one of steps 524 and 526 is performed in some instances.

At step 528, the observations recovered in the time and frequency domains from de-spreading over the frequency domain are applied to a time tracking loop and/or to channel estimation.

At step 530, the observations recovered in the time and frequency domains from de-spreading over the time domain are applied to a frequency tracking loop to address any frequency errors that may have been introduced in the channel. Although steps 528 and 530 have been described as two separate steps, it will be recognized that the different loops and estimation may occur in any order, as well as at the same time.

In addition to increasing the resolution in the frequency and time domains, there remains opportunity to reduce the overhead associated with the different reference signals, such as common reference signals and CSI reference signals while still maintaining sufficient density to assist in channel estimates and other functions. This may be accomplished by uniquely spacing the pilot symbols in the time and/or frequency domains according to embodiments of the present disclosure.

Figure 6:
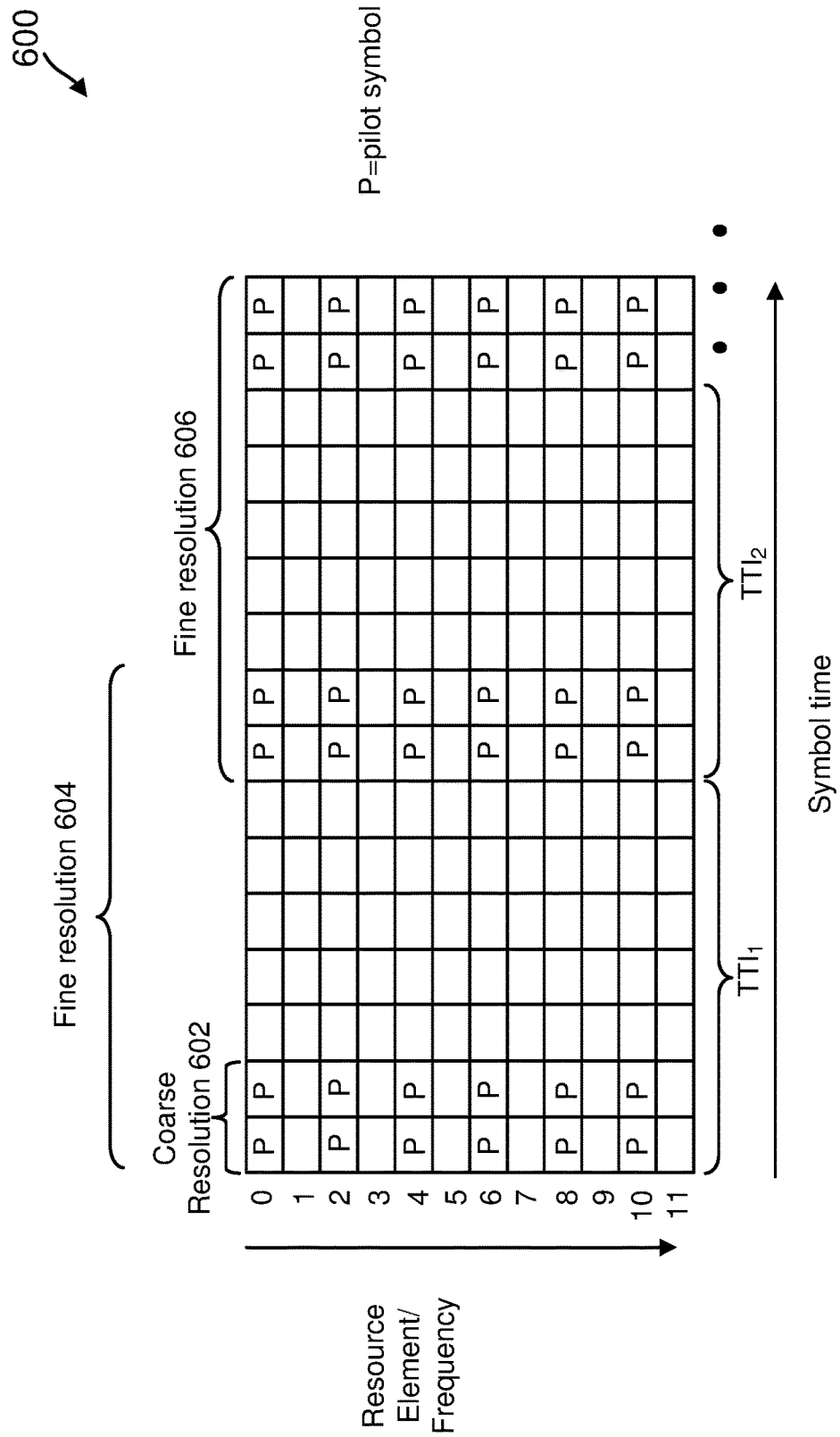
FIG. 6 illustrates a downlink frame structure for a common reference signal in a semi-uniform time domain arrangement in accordance with various aspects of the present disclosure.

FIG. 6 illustrates a downlink frame structure 600 for a common reference signal in a semi-uniform time domain arrangement in accordance with various aspects of the present disclosure. The downlink frame structure 600 includes a small symbol distance used for coarse frequency error determination and a large symbol distance used for fine frequency error determination. The downlink frame structure 600 is a view from the perspective of the receiver system 250, for example after pilot signals have been received, conditioned, and decoded.

A first set of pilot symbols are recovered that constitute a coarse frequency resolution 602. As illustrated, pilot symbols are recovered in the first two symbol periods on the subcarrier 0. Additional pilot symbols are recovered in the same two symbol periods on subcarriers 2, 4, 6, 8, and 10 as well. Pilot symbols may be recovered in more or fewer subcarriers as well, as will be recognized. The resource element spaces left blank in FIG. 6's downlink frame structure 600 may be filled with data symbols and/or various control symbols. As illustrated, the pilot symbol pair in the downlink frame structure 600 may represent symbol pairs transmitted from any one of antenna ports of the transmitting entity, e.g. port 306 or port 312 of FIG. 3A/3B, or may represent composite symbol pairs transmitted from multiple antenna ports at the same resource elements and times, thus providing orthogonality in the elements that constitute the composite pilot symbol pair (e.g., the constituent pilot symbol pairs from each transmit port).

This occurs in a first TTI. As will be recognized, the pilot symbols may be transmitted and received in different symbol periods than the first two. Further, although depicted as in neighboring symbol periods, the symbol pair in the coarse resolution 602 may alternatively be situated a given number of symbol periods apart while still within the same TTI. The smaller distance between the symbol pair in the coarse resolution 602 provides a wide-range estimate of frequency error introduced in the channel. It provides a larger pull-in range to provide a coarse estimate of the frequency error. The symbol pair in the coarse resolution 602 may be spaced in a range less than 100 μs, such as between 15 and 75 μs or between 25 and 30 μs, to name just a few examples. In an embodiment, the symbol pair in the coarse resolution 602 is spread by an orthogonal cover code at the transmitting entity, such as base station 110, according to embodiments discussed above (e.g., at the same time as another symbol pair(s) at another transmit port using a cover code orthogonal to the first one).

In a second TTI, a second set of pilot symbols (in the time domain, with multiple pilot symbols across subcarriers) is recovered. The temporal distance between the first set of pilot symbols and the second set of pilot symbols constitutes a fine resolution 604. The fine resolution 604 provides a high level of accuracy regarding the amount of frequency error introduced in the channel. The symbol pair in the fine resolution 604 may be spaced in a range greater than 200 μs, such as around 400 μs or 500 μs, to name just a few examples. The frequency error in the channel becomes a channel variation over time. Therefore, as the temporal distance between pilot symbol sets increases, it provides the opportunity to observe how the channel varies over a longer period of time, resulting in a more accurate estimate of frequency error.

If the frequency error in the channel increases to a point beyond 7, aliasing occurs which should be addressed to provide an accurate error estimate. The coarse resolution 602's wide-range estimate of the frequency error can be used to de-alias the fine resolution 604. After de-aliasing, the frequency estimate can be used in a frequency tracking loop.

The downlink frame structure 600 continues this pattern, illustrated in FIG. 6 with the third set of pilot symbols (with symbol pairs at each of two transmit ports) in a third TTI that constitutes a fine resolution 606 (e.g., the temporal spacing between the second set of pilot symbols and the third set of pilot symbols). In an alternative embodiment, the coarse resolution 602 may be used to de-alias the fine resolution 606 instead of the fine resolution 604 (i.e., the first set of pilot symbols 602 would not be used as part of a fine resolution estimate, but rather only be used for a coarse resolution estimate).

In an embodiment, the periodicity of the sets of pilot symbols is set at time of deployment. Alternatively, the periodicity of the sets of pilot symbols may be dynamically adjusted during operation, e.g. in response to an indication or request from one or more receiving entities. For example, one or more receiving entities may request that the sets be spaced either closer together or further apart in order to improve fine resolution accuracy.

Figures 7A, 7B:
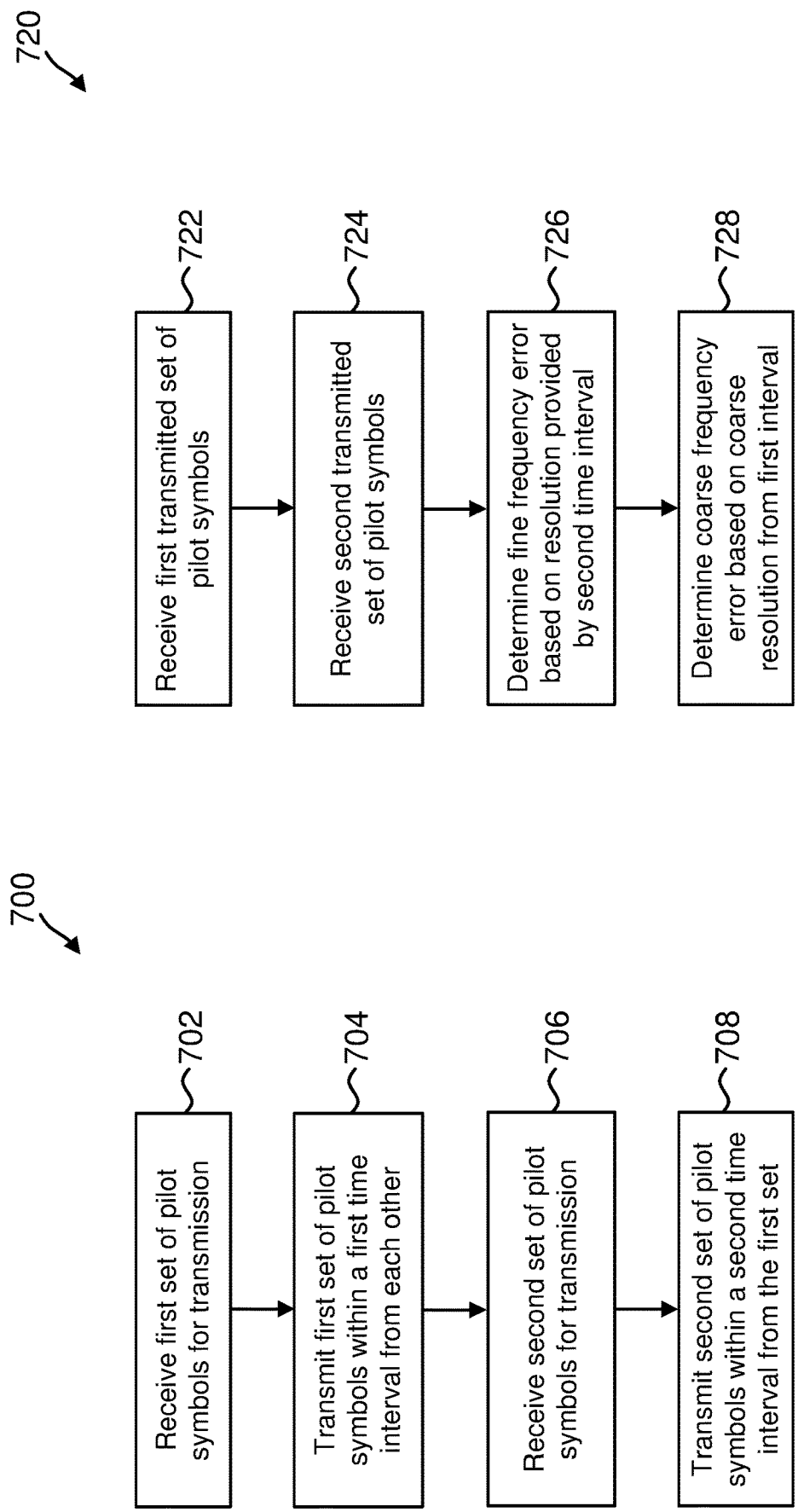
FIG. 7A is a flowchart illustrating an exemplary method for generating and transmitting common reference signals in a semi-uniform time domain arrangement in accordance with various aspects of the present disclosure.
FIG. 7B is a flowchart illustrating an exemplary method for utilizing common reference signals received in a semi-uniform time domain arrangement in accordance with various aspects of the present disclosure.

FIG. 7A is a flowchart illustrating an exemplary method for generating and transmitting common reference signals in a semi-uniform time domain arrangement in accordance with various aspects of the present disclosure. The method 700 may be implemented in a base station 110 that is in communication with one or more UEs 120. The method 700 may be implemented in the transmitter system 210 of FIG. 2 above. Instructions or code may be stored in the memory 232 that are executable by the processor 230 and/or the TX data processor 214 in the transmitter system 210 to implement the method 700.

At step 702, a transmit port (e.g., associated with one or more physical transmitters) receives a set of pilot symbols for transmission to one or more receiving entities. For example, the transmitters 222 receives the set of pilot symbols, such as a pair of pilot symbols in the time domain (e.g., pilot symbols in adjacent symbol periods) and, in embodiments, spread in the frequency domain across multiple subcarriers as illustrated in FIG. 6. In an embodiment, the transmit port is part of a MIMO system and the transmit port constitutes at least two transmitters to receive pilot symbols after they have been spread by orthogonal cover codes according to embodiments of the present disclosure. Multiple transmit ports may receive a set of pilot symbols for transmission, e.g. at the same times using the same resource elements to result in a a composite pilot symbol pair.

At step 704, the transmit port causes one or more transmitters to transmit the set of pilot symbols so that there is a first time interval between the symbol periods. In an embodiment, the set of pilot symbols are located in adjacent symbol periods, while in other embodiments there are one or more symbol periods separating the pilot symbols. In embodiments where there are differently coded sets of pilot symbols for multiple transmitters, the multiple transmitters transmit their respective sets of pilot symbols to corresponding receivers at the one or more receiving entities.

At step 706, the transmit port receives a second set of pilot symbols for transmission to the one or more receiving entities. This second set may be similar or identical in configuration to the first set, but at a different time interval. Multiple transmit ports may again receive respective second sets of pilot symbols for transmission, e.g. at the same times using the same resource elements to result in a composite pilot symbol pair again.

At step 708, the transmit port causes one or more transmitters to transmit the second set of pilot symbols to the one or more receiving entities. The second set of pilot symbols is transmitted after a second time interval has passed from transmission of the first set of pilot symbols. The second time interval is greater than the first time interval between pilot symbols in the first set of pilot symbols. In an embodiment, the transmit port receives the second set of pilot symbols after the second time interval has passed, such that the transmitter may proceed with transmission without additional delay. In an alternative embodiment, the transmit port receives the second set of pilot symbols before the second time interval has passed. The transmitter then delays transmission until the second time interval has passed.

FIG. 7B is a flowchart illustrating an exemplary method 720 for utilizing common reference signals received in a semi-uniform time domain arrangement in accordance with various aspects of the present disclosure. The method 720 may be implemented in a UE 120 that is in communication with a base station 110. The method 720 may be implemented in the receiver system 250 of FIG. 2 above. Instructions or code may be stored in the memory 272 that are executable by the processor 270 and/or the RX data processor 260 in the receiver system 250 to implement the method 720.

At step 722, a receiver receives a first set of pilot symbols from the transmitting entity. The receiver may be receiver 254 as in FIG. 2 above. The first set of pilot symbols may be a pair of pilot symbols in the time domain (e.g., pilot symbols in adjacent symbol periods) and, in embodiments, spread in the frequency domain across multiple subcarriers as illustrated in FIG. 6. The pair of pilot symbols are spread in the time domain by a first time interval, which may be very small when the pilot symbols are placed in adjacent symbol periods or small when there are one or more intervening symbol periods between them. This first time interval may be described as providing a coarse resolution, such as the coarse resolution 602 of FIG. 6 above. In an embodiment, the receiver is part of a MIMO system and the receiver constitutes at least two receivers to receive pilot symbols after they have been spread by orthogonal cover codes and transmitted according to embodiments of the present disclosure. In such embodiments, the receiver may process the received symbols to recover information in both the time and frequency domains as discussed above with respect to FIGS. 3A, 3B, 4, 5A, and 5B (e.g., de-spreading in the time and/or frequency domains, etc.).

At step 724, the receiver receives a second set of pilot symbols from the transmitting entity. The second set of pilot symbols are received after a second time interval has passed from receiving the first set of pilot symbols. The second time interval may be described as providing a fine resolution, such as the fine resolution 604 of FIG. 6, and is larger than the first time interval. The second set of pilot symbols may be received during a subsequent TTI to that in which the first set of pilot symbols was received. The TTIs in which the first and second sets of pilot symbols are received may be adjacent to each other in time or be separated in time by one or more intervening TTIs.

At step 726, a processor of the receiving entity, such as processor 270 and/or the RX data processor 260 in FIG. 2, determines a fine resolution estimate of frequency error from the channel based on the second time interval between the first and second sets of pilot symbols.

At step 728, the processor determines a coarse resolution estimate of frequency error from the channel based on the first time interval between the pilot symbols in the symbol periods of the first set of pilot symbols. This coarse resolution estimate may be used to de-alias the fine resolution estimate of frequency error. In an alternative embodiment, the coarse resolution may be determined first to set the frequency error estimate within a wide range and then the fine resolution estimate may be determined within the framework set by the coarse resolution estimate. With a frequency error estimate that has been de-aliased, the receiving entity may proceed with updating a frequency tracking loop and making adjustments in response to results from that loop.

Figure 8:
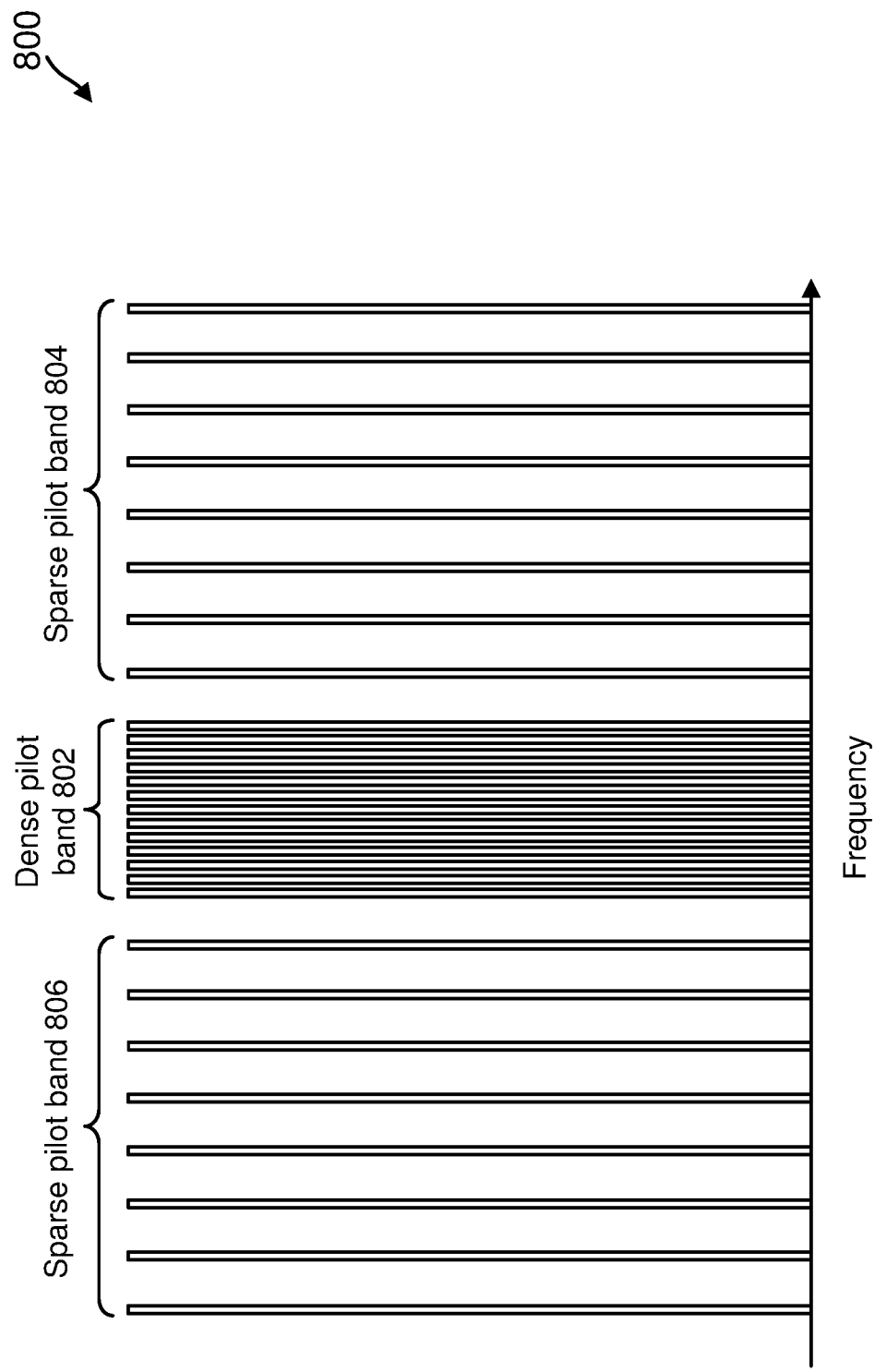
FIG. 8 illustrates common reference signal spacing in a semi-uniform frequency domain arrangement in accordance with various aspects of the present disclosure.

FIG. 8 illustrates common reference signal spacing in a semi-uniform frequency domain arrangement 800 in accordance with various aspects of the present disclosure. The semi-uniform frequency domain arrangement 800 includes a dense set of pilot symbols within a selected frequency band, e.g. the centerband, and a sparse set of pilot symbols throughout the frequency bandwidth, including within a wideband surrounding the selected frequency band and overlapping with the dense set of pilot symbols within the selected frequency band. The dense set of pilot symbols within the selected frequency band provides a better time domain resolution of observations in order to better estimate long delay channel spread. The sparse set of pilot symbols enables a significantly wideband channel estimate that can capture channel estimates across a wide bandwidth, which the dense set can de-alias for better resolution. These estimates are useful for channel energy response estimates and time tracking loops, to name a couple of examples.

In FIG. 8, there is shown a dense pilot band 802 that occupies the selected frequency band, with a sparse pilot band 804 and a sparse pilot band 806, together, surrounding the dense pilot band 802 on either side as well as overlapping with the dense set of pilot symbols in the dense pilot band 802 (not shown). In an embodiment, the pilot symbols in the dense pilot band 802 may be spaced every 1-2 subcarriers apart within an overall band of approximately 20 MHz or less. This is just one example—it will be recognized that other dense spacings and band sizes are also possible without departing from the scope of the present disclosure. The dense pilot band 802 improves the pull-in range in the frequency domain for a time tracking loop, as well as improves (expands) the channel estimate window size. This is because the dense pilot band 802 provides a wide, or coarse, time domain window that provides the improved pull-in range and the expanded channel estimate window. With this dense spacing in the dense pilot band 802, the channel estimate window may be extended, for example, to anywhere from 12.5 µs to 25 µs or more.

In an embodiment, the pilot symbols in the sparse pilot bands 804 and 806 may be spaced every 5-15 subcarriers apart, with approximately 250 pilot symbols total in the two sparse bands. These are just exemplary values, and other spacings in the sparse bands are possible as will be recognized without departing from the scope of the present disclosure. Where the sparse set of pilot symbols overlaps with the dense set in the dense pilot band 802, in one embodiment there may be separate pilot symbols placed corresponding to the sparse set and neighboring the dense set. In an alternative embodiment, selected ones of the pilot symbols in the dense set may also serve as pilot symbols in the sparse set. The sparse set of pilot symbols, e.g. in the sparse pilot bands 804 and 806 and overlapping with the dense set in the dense pilot band 802, may be used to provide a more accurate wideband channel estimate in the time domain that is de-aliased by the estimate from the dense pilot band 802. The transmitting entity may change the subcarriers of the dense pilot band 802 to provide robust performance in a frequency selective channel and so that accuracy may be improved over time.

In addition to providing improved pull-in range, channel estimate window, and time tracking loop updating, the sparse set of pilot symbols in the sparse pilot bands 804/806 and overlapping with the dense set in the dense pilot band 802 may additionally be used as one or more power reference signals (power beacon) for an automatic gain control in the UE 120, such as when the cell in which the UE 120 is located is unloaded.

Figures 9A, 9B:
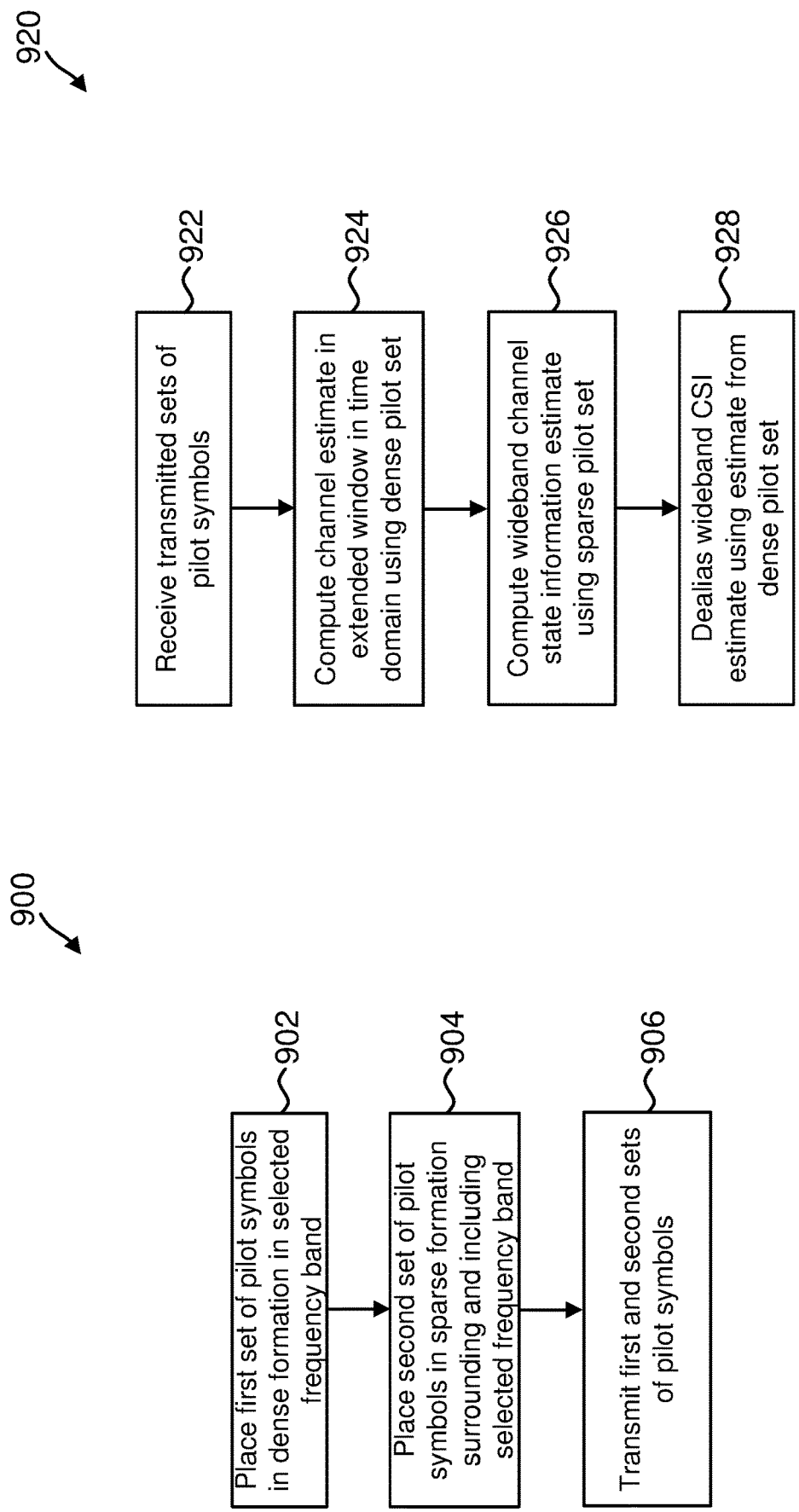
FIG. 9A is a flowchart illustrating an exemplary method for generating and transmitting common reference signals in a semi-uniform frequency domain arrangement in accordance with various aspects of the present disclosure.
FIG. 9B is a flowchart illustrating an exemplary method for utilizing common reference signals received in a semi-uniform frequency domain arrangement in accordance with various aspects of the present disclosure.

FIG. 9A is a flowchart illustrating an exemplary method 900 for generating and transmitting common reference signals in a semi-uniform frequency domain arrangement in accordance with various aspects of the present disclosure. The method 900 may be implemented in a base station 110 that is in communication with one or more UEs 120. The method 900 may be implemented in the transmitter system 210 of FIG. 2 above. Instructions or code may be stored in the memory 232 that are executable by the processor 230 and/or the TX data processor 214 in the transmitter system 210 to implement the method 900.

At step 902, a processor places a first set of pilot symbols, in the frequency domain such as in different subcarrier resource elements illustrated in prior figures, in a dense formation within a selected frequency band. The frequency band may have been selected at the time of deployment, or may be dynamically selected during operation based on a decision at the base station 110 or per request from one or more UEs 120.

At step 904, the processor places a second set of pilot symbols in a sparse pilot formation in resource elements surrounding the selected frequency band that has the first set of pilot symbols in a dense formation, as well as in the selected frequency band. As a result, the second set of pilot symbols overlaps with the first set of pilot symbols in the region of the selected frequency band.

At step 906, a transmit port receives the first and second sets of pilot symbols from the processor and transmits the combined set to one or more UEs 120.

Discussion now turns to FIG. 9B that illustrates a flowchart of an exemplary method 920 for utilizing common reference signals received in a semi-uniform frequency domain arrangement in accordance with various aspects of the present disclosure. The method 920 may be implemented in a UE 120 that is in communication with a base station 110. The method 920 may be implemented in the receiver system 250 of FIG. 2 above. Instructions or code may be stored in the memory 272 that are executable by the processor 270 and/or the RX data processor 260 in the receiver system 250 to implement the method 920.

At step 922, a receiver of the UE 120 receives a combined set of pilot symbols transmitted from the base station 110. The combined set of pilot symbols includes a dense set of pilot symbols in a selected frequency band surrounded by, and overlapping with in the selected frequency band, a sparse set of pilot symbols.

At step 924, a processor of the UE 120 computes a wide, or coarse, time domain window channel estimate based on the dense set of pilot symbols, since the dense set of pilot symbols provides an improved pull-in range and expanded channel estimate window.

At step 926, the processor computes a wideband channel state information estimate using the sparse set of pilot symbols that surround (and overlap in the selected frequency band) the dense set of pilot symbols.

At step 928, the processor de-aliases the wideband CSI estimate based on the sparse set of pilot symbols based on the coarse estimate based on the dense set of pilot symbols. In an embodiment, the coarse estimate is computed first to set the time domain channel estimate within a wide range and then the wideband CSI estimate based on the sparse set of pilot symbols may be determined within the framework set by the coarse estimate. With an estimate that has been de-aliased from a wide pull-in range, the receiving entity may proceed with updating a time tracking loop as well as utilizing the CSI estimate.

Although the semi-uniform time domain and frequency domain arrangements were discussed with respect to different figures above (e.g., FIGS. 6, 7A-7B, 8, and 9A-9B), the time domain and frequency domain arrangements may be combined so that sets of pilot symbols may exhibit both so as to harness the benefits of both in a single system. The combination of the time domain and frequency domain spacing is reflected in FIG. 10.

Figure 10:
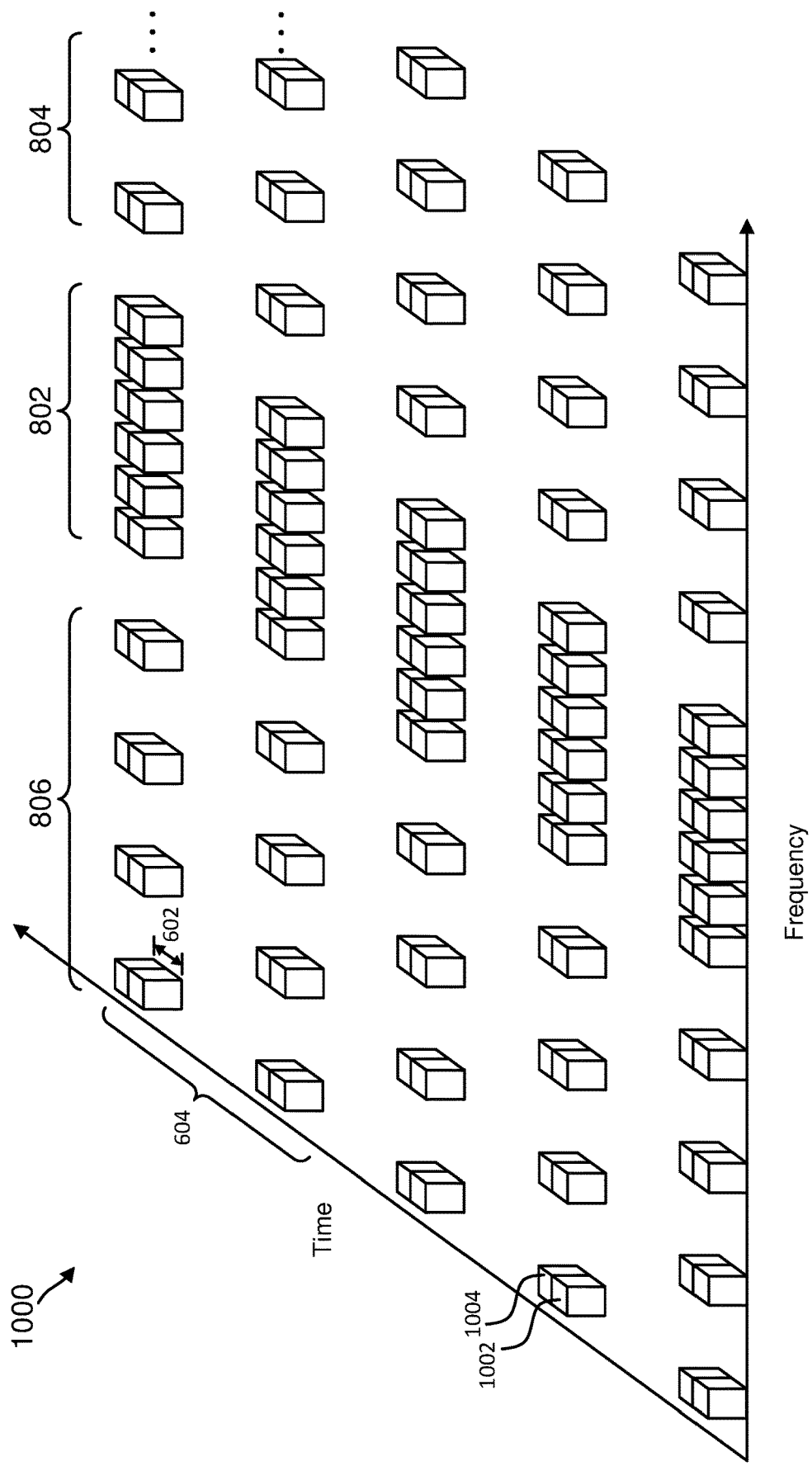
FIG. 10 illustrates common reference signal spacing in both a semi-uniform frequency domain arrangement and a semi-uniform time domain arrangement in accordance with various aspects of the present disclosure.

FIG. 10 illustrates the semi-uniform spacing along both frequency and time domain axes as labeled in the figure. Pilot symbols 1002 and 1004, shown in FIG. 10 in adjacent symbol periods along the time axis, are exemplary of how the remaining pilot symbols are depicted in FIG. 10. As can be seen, along the time axis, the pilot symbols occur in pairs along any given subcarrier along the frequency axis. As illustrated, the pilot symbols 1002 and 1004 may constitute a pilot symbol pair. In an embodiment that may be a pilot symbol pair transmitted from a single antenna port, while in another embodiment that may be a composite pilot symbol pair as seen over the air (e.g., multiple transmit ports transmitting respective pilot symbol pairs at the same resource elements and times that are orthogonalized by orthogonal cover codes in the code domain as discussed in embodiments above).

FIG. 10 illustrates the semi-uniform time domain arrangement with the exemplary coarse resolution 602 and the fine resolution 604. Although shown to be in adjacent symbol periods, the pilot symbol pairs may alternatively have one or more intervening symbol periods between them. Although not labeled, it will be recognized that the other pilot symbols in FIG. 10 include this same combination of coarse and fine resolution spacing in time.

FIG. 10 also illustrates the semi-uniform frequency domain arrangement with the dense pilot band 802 in a band at the center of the plot, and sparse pilot bands 804 and 806 surrounding the dense pilot band 802 (with the sparse set of pilot symbols overlapping with the dense set of pilot symbols in the selected band of the frequency domain). FIG. 10 is for ease of illustration only—it should be recognized that more or fewer pilot symbols may be included along either or both of the frequency and time domains than those depicted in FIG. 10.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method for wireless communication, comprising processing, by a processor of a wireless communications device, a first pilot sequence to produce a first pilot symbol pair and a second pilot sequence to produce a second pilot symbol pair; transmitting, by a transmitter, the pilot symbols of the first pilot symbol pair within a first time interval from each other in a time domain; and transmitting, by the transmitter, the second pilot symbol pair within a second time interval from the first pilot symbol pair, the second time interval being greater than the first time interval.

The method further includes transmitting the first pilot symbol pair during a first transmission time interval; and transmitting the second pilot symbol pair during a second transmission time interval, the second transmission time interval being subsequent to the first transmission time interval. The method further includes wherein the transmitting further comprises delivering a second pilot symbol of the first pilot symbol pair in an adjacent time slot to a first pilot symbol of the first pilot symbol pair. The method further includes wherein the transmitting further comprises transmitting the second pilot symbol pair after an intervening transmission time interval from the first transmission time interval. The method further includes wherein the transmitter comprises a first transmit port, the method further comprising processing, by the processor, a third pilot sequence to produce a third pilot symbol pair for transmission at the second transmit port and a fourth pilot sequence to produce a fourth pilot symbol pair for transmission at the second transmit port; transmitting, by the second transmit port, the third pilot symbol pair at a same transmission time interval as the first pilot symbol pair from the first transmit port; transmitting, by the second transmit port, the fourth pilot symbol pair at a same transmission time interval as the second pilot symbol pair from the first transmit port, the first and third pilot symbol pairs being spread with cover codes that are orthogonal to each other in time and frequency domains and first and third pilot symbol pairs comprising a first common reference signal, and the second and fourth pilot symbol pairs being spread with cover codes that are orthogonal to each other in time and frequency domains and comprising a second common reference signal. The method further includes wherein the first pilot symbol comprises a plurality of pilot symbols spread across a range of frequency subcarriers in a frequency domain, the method further comprising placing a first subset of the plurality of pilot symbols with a first plurality of subcarriers having a first frequency spacing from each other and located within a selected frequency band in the frequency domain; and placing a second subset of the plurality of pilot symbols with a second plurality of subcarriers having a second frequency spacing from each other and surrounding and including the selected frequency band, the second frequency spacing being greater than the first frequency spacing. The method further includes wherein the first time interval comprises a spacing of 100 microseconds or less; and the second time interval comprises a spacing of 200 microseconds or greater.

Embodiments of the present disclosure further include a method for wireless communication, comprising receiving, at a wireless communications device, pilot symbols of a first pilot symbol pair within a first time interval from each other; receiving, at the wireless communications device, pilot symbols of a second pilot symbol pair within a second time interval from the first pilot symbol pair, the second time interval being greater than the first time interval; and calculating, by a processor of the wireless communications device, a frequency error of a channel that conveyed the pilot symbol pairs based on an observation of channel variation during the first and second time intervals.

The method further includes de-aliasing the calculated frequency error based on an observation of channel variation during the first time interval. The method further includes receiving the first pilot symbol pair during a first transmission time interval; and receiving the second pilot symbol pair during a second transmission time interval, the second transmission time interval being subsequent to the first transmission time interval. The method further includes receiving, at the wireless communications device, a third pilot symbol pair at a same transmission time interval as the first pilot symbol pair and a fourth pilot symbol pair at a same transmission time interval as the second pilot symbol pair, the first and third pilot symbol pairs being spread with cover codes that are orthogonal to each other in time and frequency domains and the first and third pilot symbol pairs comprising a first common reference signal, and the second and fourth pilot symbol pairs being spread with cover codes that are orthogonal to each other in time and frequency domains and the second and fourth pilot symbol pairs comprising a second common reference signal. The method further includes de-spreading the first and third pilot symbol pairs in the frequency domain to recover at least two pilot observations in the time domain; and updating a frequency tracking loop with the at least two pilot observations in the time domain. The method further includes de-spreading the first and third pilot symbol pairs in the time domain to recover a pilot observation in the time domain and a dense pilot spread in the frequency domain; and estimating a channel state (with long delay spread) based on the dense pilot spread recovered in the frequency domain. The method further includes wherein the first pilot symbol comprises a plurality of pilot symbols spread across a range of subcarriers in a frequency domain, the receiving the first pilot symbol further comprising receiving a first subset of the plurality of pilot symbols placed with a first plurality of subcarriers having a first frequency spacing from each other and located within a selected frequency band; and receiving a second subset of the plurality of pilot symbols placed with a second plurality of subcarriers having a second frequency spacing from each other and surrounding and including the selected frequency band, wherein the second frequency spacing is greater than the first frequency spacing. The method further includes calculating a wideband channel estimate based on the second subset of the plurality of pilot symbols having the second frequency spacing surrounding and including the selected frequency band; calculating a centerband channel estimate based on the first subset of the plurality of pilot symbols having the first frequency spacing within the selected frequency band; and de-aliasing the wideband channel estimate based on the centerband channel estimate with fine frequency resolution (in order to estimate long delay spread).

Embodiments of the present disclosure further include a method for wireless communication, comprising processing, by a processor of a wireless communications device, a pilot sequence to produce a plurality of pilot symbols spread across a range of frequency subcarriers in a frequency domain; and transmitting, by a transmitter of the wireless communications device: a first subset of the plurality of pilot symbols with a first plurality of subcarriers having a first frequency spacing from each other and located within a selected frequency band in the frequency domain, and a second subset of the plurality of pilot symbols with a second plurality of subcarriers having a second frequency spacing from each other and surrounding and including the selected frequency band, the second frequency spacing being greater than the first frequency spacing.

The method further includes transmitting the first and second pluralities of pilot symbols during a first transmission time interval. The method further includes wherein the first frequency spacing comprises a spacing of two or fewer subcarriers between pilot symbols from among the first plurality of pilot symbols in the selected frequency band; and the second frequency spacing comprises a spacing of eight or more subcarriers between pilot symbols from among the second plurality of pilot symbols surrounding and including the selected frequency band. The method further includes wherein the pilot sequence comprises a first pilot sequence and the plurality of pilot symbols comprises a first plurality of pilot symbols, the method further comprising processing, by the processor, a second pilot sequence to produce a second plurality of pilot symbols; and transmitting, by the transmitter, pilot symbols of the first plurality of pilot symbols within a first time interval from each other and pilot symbols of the second plurality of pilot symbols within a second time interval from the first plurality of pilot symbols, the second time interval being greater than the first time interval. The method further includes wherein the pilot sequence comprises a first pilot sequence and the plurality of pilot symbols comprises a first plurality of pilot symbols and the transmitter comprises a first transmit port, the method further comprising processing, by the processor, a second pilot sequence to produce a second plurality of pilot symbols for transmission at a second transmit port; and transmitting, by the second transmit port, the second plurality of pilot symbols at a same transmission time interval as the first plurality of pilot symbols from the first transmit port, the first and second pluralities pilot symbols being spread with cover codes that are orthogonal to each other in time and frequency domains and the first and second pluralities of pilot symbols comprising a common reference signal.

Embodiments of the present disclosure further include a method for wireless communication, comprising receiving, at a wireless communications device, a plurality of pilot symbols spread across a plurality of different subcarriers in a frequency domain, the plurality of pilot symbols comprising: a first subset of the plurality of pilot symbols placed with a first plurality of subcarriers having a first frequency spacing from each other and located within a selected frequency band; and a second subset of the plurality of pilot symbols placed with a second plurality of subcarriers having a second frequency spacing from each other and surrounding and including the selected frequency band, wherein the second frequency spacing is greater than the first frequency spacing; and calculating, by a processor of the wireless communications device, a wideband channel estimate based on the second subset of the plurality of pilot symbols having the second frequency spacing surrounding and including the selected frequency band.

The method further includes calculating a centerband channel estimate based on the first subset of the plurality of pilot symbols having the first frequency spacing within the selected frequency band. The method further includes de-aliasing the wideband channel estimate based on the centerband channel estimate. The method further includes wherein the plurality of pilot symbols comprises a first plurality of pilot symbols, the method further comprising receiving, at the wireless communications device, pilot symbols of the first plurality of pilot symbols within a first time interval from each other; receiving, at the wireless communications device, the second plurality of pilot symbols within a second time interval from the first plurality of pilot symbols, the second time interval being greater than the first time interval; calculating, by the processor, a frequency error of a channel that conveyed the plurality of pilot symbols based on an observation of channel variation during the second time interval; and de-aliasing the calculated frequency error based on an observation of channel variation during the first time interval. The method further includes receiving, at the wireless communications device, a second plurality of pilot symbols at a same transmission time interval as the first plurality of pilot symbols, the first and second pluralities pilot symbols being spread with cover codes that are orthogonal to each other in time and frequency domains and the first and second pluralities of pilot symbols comprising a common reference signal. The method further includes de-spreading the first and second pluralities of pilot symbols in the frequency domain to recover at least two pilot observations in the time domain; and updating a frequency tracking loop with the at least two pilot observations in the time domain. The method further includes de-spreading the first and second pluralities of pilot symbols in the time domain to recover a pilot observation in the time domain and a dense pilot spread in the frequency domain; and estimating a channel state with long delay spread based on the dense pilot spread recovered in the frequency domain.

Embodiments of the present disclosure further include a wireless communications device that comprises at least one receiver configured to receive a first set of pilot symbols using a number of resource elements and spread with a first cover code; and receive a second set of pilot symbols using a second number of resource elements and spread with a second cover code, the first and second cover codes being orthogonal to each other in time and frequency domains, the first and second set of pilot symbols comprising a common reference signal; and a processor configured to de-spread the first and second sets of pilot symbols in the frequency domain to recover at least two pilot observations in the time domain.

The wireless communications device further includes wherein the processor is further configured to de-spread the first and second sets of pilot symbols in the time domain to recover a pilot observation in the time domain and a dense pilot spread in the frequency domain; and estimate a channel state with long delay spread based on the dense pilot spread recovered in the frequency domain. The wireless communications device further includes wherein the processor is further configured to update a frequency tracking loop with the at least two pilot observations in the time domain (by de-spreading two pilot ports over the frequency domain). The wireless communications device further includes wherein the first set of pilot symbols comprises a pair of pilot symbols received within a first time interval from each other in the time domain, the at least one receiver further configured to receive a third set of pilot symbols and a fourth set of pilot symbols at the wireless communications device within a second time interval of the first and second sets of pilot symbols in the time domain, the second time interval being greater than the first time interval. The wireless communications device further includes wherein the processor is further configured to compute a fine-resolution frequency error of a channel that conveyed the first and third sets of pilot symbols (and the second and fourth sets of pilot symbols) based on an observation of channel variation during the second time interval; and de-alias the fine-resolution frequency error based on an observation of channel variation during the first time interval. The wireless communications device further includes wherein the number of resource elements are placed at different subcarriers in the frequency domain, the at least one receiver further configured to receive a first subset of the first set of pilot symbols placed with a first plurality of subcarriers having a first frequency spacing from each other and located within a selected frequency band; and receive a second subset of the first set of pilot symbols placed with a second plurality of subcarriers having a second frequency spacing from each other and surrounding and including the selected frequency band, wherein the second frequency spacing is greater than the first frequency spacing.

Embodiments of the present disclosure further include a wireless communications device that comprises a processor configured to process a first pilot sequence to produce a first pilot symbol pair and a second pilot sequence to produce a second pilot symbol pair; a transceiver configured to transmit the pilot symbols of the first pilot symbol pair within a first time interval from each other in a time domain; and transmit the second pilot symbol pair within a second time interval from the first pilot symbol pair, the second time interval being greater than the first time interval.

The wireless communications device further includes wherein the transceiver is further configured to transmit the first pilot symbol pair during a first transmission time interval; and transmit the second pilot symbol pair during a second transmission time interval, the second transmission time interval being subsequent to the first transmission time interval. The wireless communications device further comprises wherein the transceiver is further configured to deliver a second pilot symbol of the first pilot symbol pair in an adjacent time slot to a first pilot symbol of the first pilot symbol pair. The wireless communications device further includes wherein the transceiver comprises a first transmit port; and the processor is further configured to process third and fourth pilot sequences to produce third and fourth pilot symbol pairs, the transceiver further comprising a second transmit port configured to transmit the third pilot symbol pair at a same transmission time interval as the first pilot symbol pair from the first transmit port and the fourth pilot symbol pair at a same transmission time interval as the second pilot symbol pair, the first and third pilot symbol pairs and the second and fourth pilot symbol pairs being respectively spread with cover codes that are orthogonal to each other in time and frequency domains and first and third pilot symbol pairs comprising a first common reference signal and second and fourth pilot symbol pairs comprising a second common reference signal. The wireless communications device further includes wherein the first pilot symbol comprises a plurality of pilot symbols spread across a range of frequency subcarriers in a frequency domain, the transceiver further configured to place a first subset of the plurality of pilot symbols with a first plurality of subcarriers having a first frequency spacing from each other and located within a selected frequency band in the frequency domain; and place a second subset of the plurality of pilot symbols with a second plurality of subcarriers having a second frequency spacing from each other and surrounding and including the selected frequency band, the second frequency spacing being greater than the first frequency spacing. The wireless communications device further includes wherein the first time interval comprises a spacing of e.g. 100 microseconds or less; and the second time interval comprises a spacing of e.g. 200 microseconds or greater.

Embodiments of the present disclosure further include a wireless communications device comprising at least one receiver configured to receive pilot symbols of a first pilot symbol pair within a first time interval from each other; and receive pilot symbols of a second pilot symbol pair within a second time interval from the first pilot symbol pair, the second time interval being greater than the first time interval; and a processor configured to calculate a frequency error of a channel that conveyed the pilot symbol pairs based on an observation of channel variation during the first and second time intervals.

The wireless communications device further includes wherein the processor is further configured to de-alias the calculated frequency error based on an observation of channel variation during the first time interval. The wireless communications device further includes wherein the at least one receiver is further configured to receive the first pilot symbol pair during a first transmission time interval; and receive the second pilot symbol pair during a second transmission time interval, the second transmission time interval being subsequent to the first transmission time interval. The wireless communications device further includes wherein the at least one receiver is further configured to receive a third pilot symbol pair at a same transmission time interval as the first pilot symbol pair and a fourth pilot symbol pair at a same transmission time interval as the second pilot symbol pair, the first and third pilot symbol pairs being spread with cover codes that are orthogonal to each other in time and frequency domains and the second and fourth pilot symbol pairs being spread with cover codes that are orthogonal in time and frequency domains, and the first and third pilot symbol pairs comprising a first common reference signal and the second and fourth pilot symbol pairs comprising a second common reference signal. The wireless communications device further includes wherein the processor is further configured to de-spread the first and third pilot symbol pairs in the frequency domain to recover at least two pilot observations in the time domain; and update a frequency tracking loop with the at least two pilot observations in the time domain. The wireless communications device further includes wherein the processor is further configured to de-spread the first and third pilot symbol pairs in the time domain to recover a pilot observation in the time domain and a dense pilot spread in the frequency domain; and estimate a channel state based on the dense pilot spread recovered in the frequency domain. The wireless communications device further includes wherein the first pilot symbol comprises a plurality of pilot symbols spread across a range of subcarriers in the frequency domain, the at least one receiver further configured to receive a first subset of the plurality of pilot symbols placed with a first plurality of subcarriers having a first frequency spacing from each other and located within a selected frequency band; and receive a second subset of the plurality of pilot symbols placed with a second plurality of subcarriers having a second frequency spacing from each other and surrounding and including the selected frequency band, wherein the second frequency spacing is greater than the first frequency spacing. The wireless communications device further includes wherein the processor is further configured to calculate a wideband channel estimate based on the second subset of the plurality of pilot symbols having the second frequency spacing surrounding and including the selected frequency band; calculate a centerband channel estimate based on the first subset of the plurality of pilot symbols having the first frequency spacing within the selected frequency band; and de-alias the wideband channel estimate based on the centerband channel estimate.

Embodiments of the present disclosure further include a wireless communications device comprising a processor configured to process a pilot sequence to produce a plurality of pilot symbols spread across a range of frequency subcarriers in a frequency domain; and a transceiver configured to transmit a first subset of the plurality of pilot symbols with a first plurality of subcarriers having a first frequency spacing from each other and located within a selected frequency band in the frequency domain, and transmit a second subset of the plurality of pilot symbols with a second plurality of subcarriers having a second frequency spacing from each other and surrounding and including the selected frequency band, the second frequency spacing being greater than the first frequency spacing.

The wireless communications device further includes wherein the transceiver is further configured to transmit the first and second pluralities of pilot symbols during a first transmission time interval. The wireless communications device further includes wherein the first frequency spacing comprises a spacing of e.g. two or fewer subcarriers between pilot symbols from among the first plurality of pilot symbols in the selected frequency band; and the second frequency spacing comprises a spacing of e.g. eight or more subcarriers between pilot symbols from among the second plurality of pilot symbols surrounding and including the selected frequency band. The wireless communications device further includes wherein the pilot sequence comprises a first pilot sequence and the plurality of pilot symbols comprises a first plurality of pilot symbols, the processor is further configured to process a second pilot sequence to produce a second plurality of pilot symbols, and the transmitter is further configured to transmit pilot symbols of the first plurality of pilot symbols within a first time interval from each other and pilot symbols of the second plurality of pilot symbols within a second time interval from the first plurality of pilot symbols, the second time interval being greater than the first time interval. The wireless communications device further includes wherein the pilot sequence comprises a first pilot sequence and the plurality of pilot symbols comprises a first plurality of pilot symbols, the transceiver comprises a first transmit port and a second transmit port, the processor is further configured to process a second pilot sequence to produce a second plurality of pilot symbols for transmission at the second transmit port, and the second transmit port is configured to transmit the second plurality of pilot symbols at a same transmission time interval as the first plurality of pilot symbols from the first transmit port, the first and second pluralities pilot symbols being spread with cover codes that are orthogonal to each other in time and frequency domains and the first and second pluralities of pilot symbols comprising a common reference signal.

Embodiments of the present disclosure further include a wireless communications device comprising at least one receiver configured to receive a plurality of pilot symbols spread across a plurality of different subcarriers in a frequency domain, the plurality of pilot symbols comprising a first subset of the plurality of pilot symbols placed with a first plurality of subcarriers having a first frequency spacing from each other and located within a selected frequency band; and a second subset of the plurality of pilot symbols placed with a second plurality of subcarriers having a second frequency spacing from each other and surrounding and including the selected frequency band, wherein the second frequency spacing is greater than the first frequency spacing; and a processor configured to calculate a wideband channel estimate based on the second subset of the plurality of pilot symbols having the second frequency spacing surrounding and including the selected frequency band.

The wireless communications device further includes wherein the processor is further configured to calculate a centerband channel estimate based on the first subset of the plurality of pilot symbols having the first frequency spacing within the selected frequency band; and de-alias the wideband channel estimate based on the centerband channel estimate. The wireless communications device further includes wherein the plurality of pilot symbols comprises a first plurality of pilot symbols, the at least one receiver further configured to receive pilot symbols of the first plurality of pilot symbols within a first time interval from each other; and receive the second plurality of pilot symbols within a second time interval from the first plurality of pilot symbols, the second time interval being greater than the first time interval; and the processor is further configured to calculate a frequency error of a channel that conveyed the plurality of pilot symbols based on an observation of channel variation during the second time interval and de-alias the calculated frequency error based on an observation of channel variation during the first time interval. The wireless communications device further includes wherein the receiver is further configured to receive a second plurality of pilot symbols at a same transmission time interval as the first plurality of pilot symbols, the first and second pluralities pilot symbols being spread with cover codes that are orthogonal to each other in time and frequency domains and the first and second pluralities of pilot symbols comprising a common reference signal. The wireless communications device further includes wherein the processor is further configured to de-spread the first and second pluralities of pilot symbols in the frequency domain to recover at least two pilot observations in the time domain; and update a frequency tracking loop with the at least two pilot observations in the time domain. The wireless communications device further includes wherein the processor is further configured to de-spread the first and second pluralities of pilot symbols in the time domain to recover a pilot observation in the time domain and a dense pilot spread in the frequency domain; and estimate a channel state based on the dense pilot spread recovered in the frequency domain.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, comprising:
receiving, by a wireless communications device, a first subset of a set of pilot symbols arranged with a first subcarrier density in a first frequency region and a second subset of the set of pilot symbols arranged with a second subcarrier density in a second frequency region, the first and second subcarrier densities being different;

performing, by the wireless communications device based on the set of pilot symbols, time tracking correction; and performing, based on the time tracking correction, coherent demodulation of downlink data.

2. The method of claim 1, wherein the first frequency region of the first subset comprises a first bandwidth and the second frequency region of the second subset comprises a second bandwidth, the second bandwidth being greater than the first bandwidth.

3. The method of claim 1, wherein the first subcarrier density is greater than the second subcarrier density.

4. The method of claim 3, further comprising:
determining a wideband channel estimate based on the second subset of the set of pilot symbols.

5. The method of claim 4, further comprising:
de-aliasing the wideband channel estimate based on the first subset of the set of pilot symbols.

6. The method of claim 3, further comprising:
computing a time domain window channel estimate based on the first subset of the set of pilot symbols.

7. The method of claim 1, wherein the first frequency region overlaps at least in part with the second frequency region.

8. The method of claim 1, further comprising:
using the set of pilot symbols as a power reference signal for an automatic gain control.

9. A wireless communications device, comprising a transceiver and one or more processors in communication with the transceiver, wherein the wireless communications device is configured to:
receive a first subset of a set of pilot symbols arranged with a first subcarrier density in a first frequency region and a second subset of the set of pilot symbols arranged with a second subcarrier density in a second frequency region, the first and second subcarrier densities being different;
perform time tracking correction based on the set of pilot symbols; and
perform, based on the time tracking correction, coherent demodulation of downlink data.

10. The wireless communications device of claim 9, wherein the first frequency region of the first subset comprises a first bandwidth and the second frequency region of the second subset comprises a second bandwidth, the second bandwidth being greater than the first bandwidth.

11. The wireless communications device of claim 9, wherein the first subcarrier density is greater than the second subcarrier density.

12. The wireless communications device of claim 11, wherein the wireless communications device is further configured to:
determine a wideband channel estimate based on the second subset of the set of pilot symbols.

13. The wireless communications device of claim 12, wherein the wireless communications device is further configured to:
de-alias the wideband channel estimate based on the first subset of the set of pilot symbols.

14. The wireless communications device of claim 11, wherein the wireless communications device is further configured to:
compute a time domain window channel estimate based on the first subset of the set of pilot symbols.

15. The wireless communications device of claim 9, wherein the first frequency region overlaps at least in part with the second frequency region.

16. A method for wireless communication, comprising:
placing, by a wireless communications device, a first subset of a set of pilot symbols arranged with a first subcarrier density in a first frequency region and a second subset of the set of pilot symbols arranged with a second subcarrier density in a second frequency region, the first and second subcarrier densities being different; and
transmitting, by the wireless communications device after the placing, the set of pilot symbols to a second wireless communications device for time tracking correction based on the set of pilot symbols.

17. The method of claim 16, wherein the first frequency region of the first subset comprises a first bandwidth and the second frequency region of the second subset comprises a second bandwidth, the second bandwidth being greater than the first bandwidth.

18. The method of claim 16, wherein the first subcarrier density is greater than the second subcarrier density.

19. The method of claim 16, wherein the transmitting of the set of pilot symbols is performed within a single symbol period.

20. The method of claim 16, wherein the first frequency region overlaps at least in part with the second frequency region.

21. A wireless communications device, comprising a transceiver and one or more processors in communication with the transceiver, wherein the wireless communications device is configured to:
place a first subset of a set of pilot symbols arranged with a first subcarrier density in a first frequency region and a second subset of the set of pilot symbols arranged with a second subcarrier density in a second frequency region, the first and second subcarrier densities being different; and
transmit the set of pilot symbols to a second wireless communications device for time tracking correction based on the set of pilot symbols.

22. The wireless communications device of claim 21, wherein the first frequency region of the first subset comprises a first bandwidth and the second frequency region of the second subset comprises a second bandwidth, the second bandwidth being greater than the first bandwidth.

23. The wireless communications device of claim 21, wherein the transmitting of the set of pilot symbols is performed within a single symbol period.

* * * * *